United States Patent
Sankaranarasimhan et al.

(10) Patent No.: US 10,228,831 B2
(45) Date of Patent: Mar. 12, 2019

(54) SHARING CARDS TO A TARGET APPLICATION

(71) Applicant: Samsung Electronics Co., Ltd., Suwon-si, Gyeonggi-do (KR)

(72) Inventors: Manikandan Sankaranarasimhan, Fremont, CA (US); Kalyan Desineni, Mountain View, CA (US); Tomer Kagan, Sunnyvale, CA (US); Rajat Mukherjee, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 682 days.

(21) Appl. No.: 14/980,860

(22) Filed: Dec. 28, 2015

(65) Prior Publication Data

US 2017/0010765 A1   Jan. 12, 2017

Related U.S. Application Data

(60) Provisional application No. 62/190,436, filed on Jul. 9, 2015.

(51) Int. Cl.
| | |
|---|---|
| *G06F 3/0482* | (2013.01) |
| *G06F 3/0484* | (2013.01) |
| *G06F 3/0481* | (2013.01) |
| *G06F 3/0483* | (2013.01) |
| *G06F 3/048* | (2013.01) |

(Continued)

(52) U.S. Cl.
CPC ........ *G06F 3/04842* (2013.01); *G06F 3/0482* (2013.01); *G06F 3/14* (2013.01); *G06F 17/3087* (2013.01); *G06F 17/30887* (2013.01); *G06N 99/005* (2013.01); *G09G 5/14* (2013.01); *H04L 67/18* (2013.01); *G06F 3/048* (2013.01); *G06F 3/0483* (2013.01); *G06F 3/04817* (2013.01); *G06F 17/30876* (2013.01); *G06F 17/30882* (2013.01)

(58) Field of Classification Search
CPC .... G06F 3/04842; G06F 3/0482; G06F 3/048; G06F 3/04817; G06F 3/0483; G06F 3/14; G06F 17/3087; G06F 17/30887; G06F 17/30876; G06F 17/30882; H04L 67/18; G06N 99/005; G09G 5/14

See application file for complete search history.

(56) References Cited

U.S. PATENT DOCUMENTS

| | | | |
|---|---|---|---|
| 2013/0212539 A1* | 8/2013 | Hebbar | G06F 9/451 715/854 |
| 2015/0052454 A1* | 2/2015 | Cai | 715/753 |
| 2017/0248486 A1* | 8/2017 | Etheredge | F15B 13/044 |

* cited by examiner

*Primary Examiner* — Ting Z Lee
(74) *Attorney, Agent, or Firm* — Jefferson IP Law, LLP

(57) ABSTRACT

According to some implementations of the present disclosure, a method is provided. The method includes presenting a state of a first application and obtaining state indication data corresponding to the state of the first application. The method further includes transmitting the state indication data to a card system and receiving an availability indicator indicating whether the card system can provide a card corresponding to the state of the first application. The method includes displaying a first selection element overlaying a graphical user interface of the first application when the availability indicator indicates that the card system can provide the card and displaying a second selection element overlaying a graphical user interface of the first application when the availability indicator indicates that the card system cannot provide the card.

18 Claims, 16 Drawing Sheets

(51) Int. Cl.
*G06F 3/14* (2006.01)
*G06F 17/30* (2006.01)
*G06N 99/00* (2010.01)
*G09G 5/14* (2006.01)
*H04L 29/08* (2006.01)

SHARING CARDS TO A TARGET APPLICATION

CROSS-REFERENCE TO RELATED APPLICATION

This application claims the benefit of U.S. provisional patent application 62/190,436 filed on Jul. 9, 2015, the contents of which are hereby incorporated by reference in their entirety.

TECHNICAL FIELD

The present disclosure is directed to techniques for inserting a card for an active application state into a target application.

BACKGROUND

The wide-spread adoption of mobile user devices has led to a sharp increase in the consumption of electronic content, including videos, on-line articles, music, and the like. Different software applications provide different content and functionality. One trend that differentiates electronic content from traditional forms of content is the amount of content that is shared between people. A funny video may be made available on one day, and through "sharing" via social media outlets, the video may be viewed by a million people in a few hours. Typically a user will share a URL with others users to share the content.

SUMMARY

According to some implementations of the present disclosure, a method is provided. The method includes presenting a state of a first application and obtaining state indication data corresponding to the state of the first application. The method further includes transmitting the state indication data to a card system and receiving an availability indicator indicating whether the card system can provide a card corresponding to the state of the first application. The method includes displaying a first selection element overlaying a graphical user interface of the first application when the availability indicator indicates that the card system can provide the card and displaying a second selection element overlaying a graphical user interface of the first application when the availability indicator indicates that the card system cannot provide the card.

According to some implementations of the present disclosure, a computer-readable medium storing a set of computer readable instructions executable by a processing device of a user device is disclosed. The computer readable instructions, when executed by the processing device, causing the processing device to present a state of a first application via a user interface of the user device, obtain state indication data corresponding to the state of the first application, transmit the state indication data to a card system, and receive an availability indicator indicating whether the card system can provide a card corresponding to the state of the first application. When the availability indicator indicates that the card system can provide the card, the instructions cause the processing device to display a first selection element over a graphical user interface of the first application. When the availability indicator indicates that the card system cannot provide the card, the instructions cause the processing device to display a second selection element over a graphical user interface of the first application.

According to some implementations of the present disclosure, a method is presented. The method includes receiving a card system request from a user device. The card system request includes state indication data indicating a state of an active application executing on the user device. The method further includes determining whether a card object corresponding to the indicated state can be delivered to the user device based on the state indication data and a plurality of card records. Each card record corresponds to one or more states of an application. When the card object can be delivered to the user device, the method includes transmitting an availability indicator to the user device indicating the card object can be delivered. The method further includes generating the card object, which includes one or more resource identifiers linking to the indicated state, card data defining content that is presented in a card corresponding to the indicated state, and a layout file defining a layout of the card corresponding to the indicated state, the content being bound to the layout file. The method further includes providing the card object to the user device.

The details of one or more implementations of the disclosure are set forth in the accompanying drawings and the description below. Other aspects, features, and advantages will be apparent from the description, drawings, and claims.

DESCRIPTION OF DRAWINGS

Like reference symbols in the various drawings indicate like elements.

DETAILED DESCRIPTION

Figure 1:
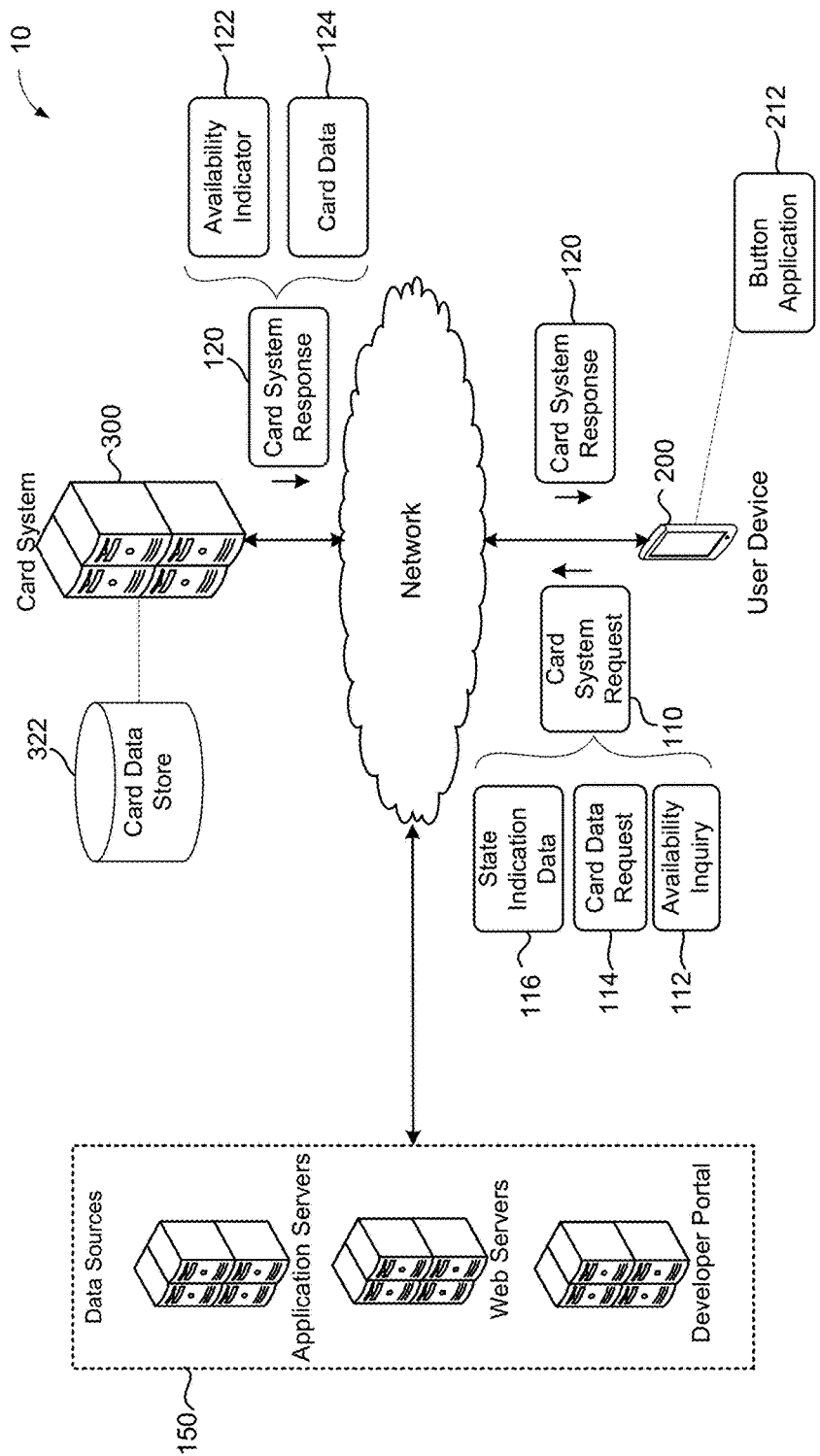
FIG. 1 illustrates an example environment that includes a card system in communication with user devices and data sources.

Systems and techniques directed to inserting cards corresponding to a first application state of a first application (e.g., referred to as an active application) into another application (referred to as a "target application") are herein disclosed. A card may refer to a graphical user interface (GUI) element that represents an application state. A card may include text, images, icons, and/or user interface input elements. A card may be a link that, when selected, links to the represented state of the application. Additionally or alternatively, a card may access functions of the represented application. For example, the card may include computer-readable instructions, such that when the card is selected by the user, the computer-readable instructions cause the user device to make a request to the application or to an API request to a third-party server. The third-party server may return content that is displayed within the card. In some implementations, a card may present information from the first application state in a manner that is consistent with the look and feel of the first application. In other implementations, the card may express the functionality in a specific, consistent user-friendly layout. The techniques of the present disclosure may provide a streamlined user experience for bookmarking application information and/or sharing application information with other users.

According to some implementations of the present disclosure, a user device may execute a button application and a plurality of native applications. The button application may be in communication with a remote card system. The remote card system may serve cards representing states of various applications. The button application may display an interactive button (referred to as a "card button") that overlays a GUI of an application that is currently accessed by the user device (referred to as the "active application"). The appearance of the card button may be varied to indicate to a user whether the current state of the active application can be represented by a card. The button may be displayed in a different manner (e.g., bolded or faded) depending on whether the card system can provide or facilitate the providing of a card representing the current state of the active application. For instance, if the user is viewing a video and wants to share a card representing the video, the button may be darkened to indicate that the card system can generate a card representing the video. If, however, the user is playing a game that is not recognized by the card system, the button may be faded or without color to indicate that the card system cannot generate a card representing the video.

If a card is available for the current underlying application state, the card system may provide an availability indicator to the user device indicating that a card is available for a given state. In response, the user device can request the card (which may be encoded in a card object) for the current state in response to the user selecting (e.g., touching) the card button. Alternatively, the card system can transmit the card when available with or in lieu of the availability indicator. The button application can receive the card from the card system and embed the received card into a target application, such as a messenger application, a social networking application, or other application. The user and/or others interacting with the target application can view the card and/or interact with the card. In some implementations, the card may include an underlying access mechanism for opening the application state associated with the card in a native/web application. In these implementations, the card can be selected (e.g., touched) in order to open the application state associated with the card. For example, the user and/or others can touch the card in the target application to open the application state associated with the card. In some implementations, the card system may transmit the card to a third-party system such that the third-party system distributes the card to other users. For example, a user may request to share a card with a set of other users via a social networking application or a transient messaging application. In addition to or in lieu of sending the card to the user device of the user, the card system may transmit the card to a server of the social networking application, whereby the social networking system distributes the card to other users.

The user device can request the card from the card system using state indication data. In some implementations, the state indication data is an access mechanism such as a resource identifier (e.g., URL or application resource identifier) for the represented state. In some implementations, the state indication data indicates a layout, the user input elements, and/or the content of a state. In some of these implementations, the user device (e.g., the button application) captures a layout of the active application at the current state, the user input elements presented at the active application at the current state, and/or the content presented by the active application at the current state and transmits a representation of the layout, user input elements, and/or content to the card system. The card system utilizes the layout and/or content representation to identify the state of the application. In this way, the button application can request cards from the card system in the event it does not have access to information regarding the active application.

FIG. 1 illustrates an example environment that includes a card system 300 in communication with user devices 200 and data sources 150. A card system 300 is a set of one or more computing devices that provides cards to requesting user devices 200. As described herein, a user device 200 can execute a button application 212 that requests a card from the card system 300, the card being representative of a current state of the active application on the user device 200. If the current state can be represented by a card, the card system 300 can transmit the card to the requesting user device 200. The user device 200 may insert a card received from the card system 300 into a target application.

Figure 3A:
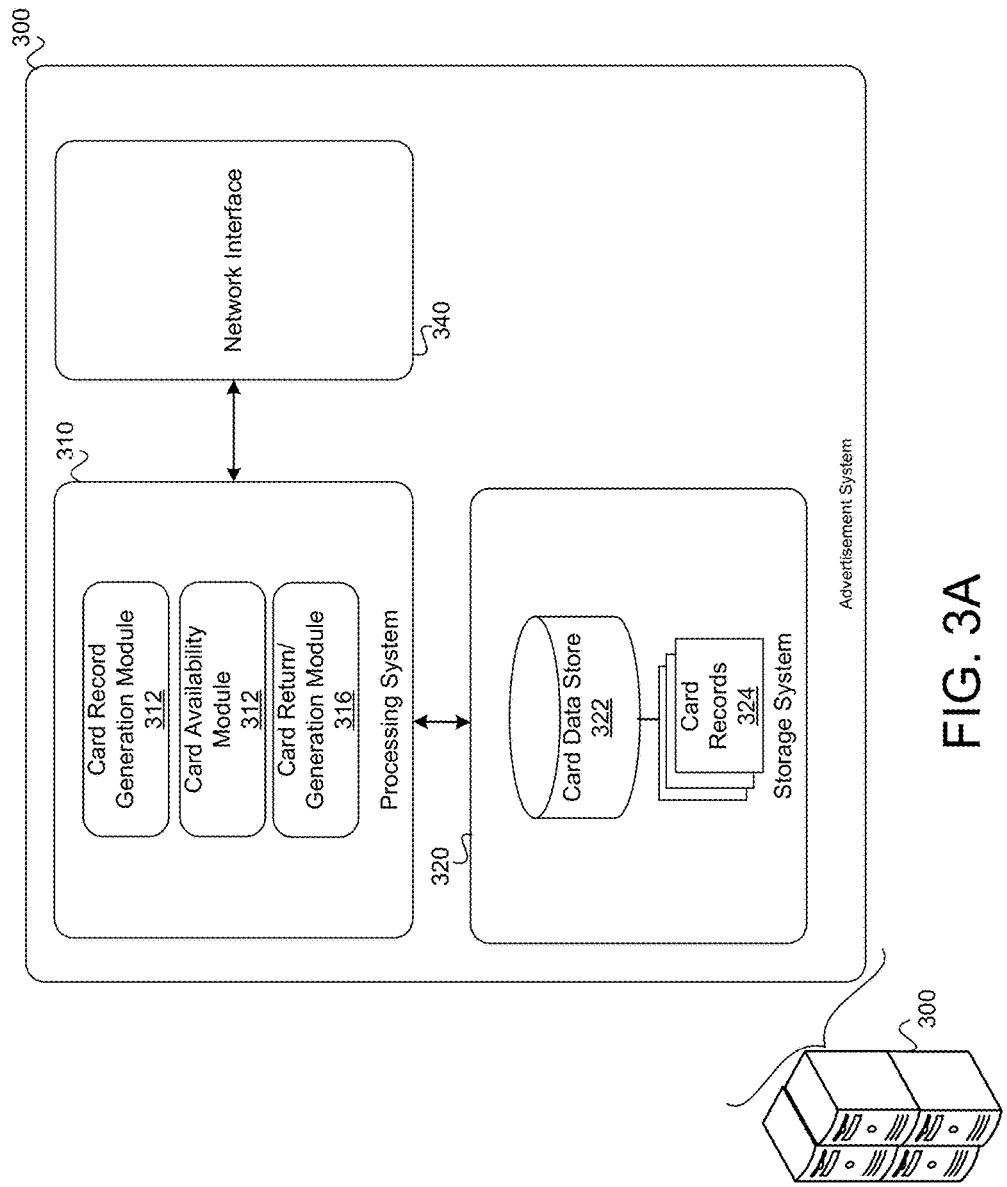
FIG. 3A illustrates an example card system and example components thereof.
Figure 3B:
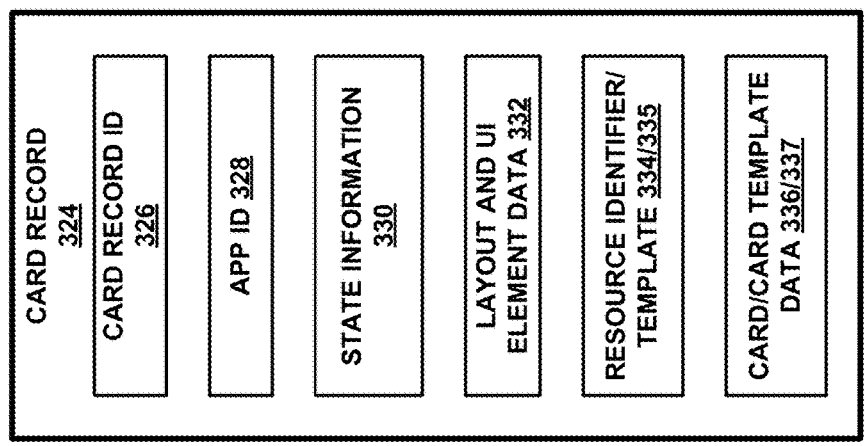
FIG. 3B illustrates an example of a card record.

In some implementations, the card system 300 includes a card data store 322. The data stored in the card data store 322 may be represented by card records 324 (FIGS. 3A and 3B). The card system 300 obtains the data that is stored in the card records from the data sources 150. In some implementations, the card system 300 generates card records based on data retrieved from the data sources 150. The data that is collected may be representative of various states of applications or collections of states. The data that is collected may include a name of an application, content presented at a state of an application, a layout of an application at a given state (or information regarding the layout) and access mechanisms or templates to generate access mechanisms with which to request the content presented at the state on a user device. The data that is collected may also include data representing a layout of the card and/or a template to generate a card. Data sources 150 can include web servers, application servers, and/or developer portals, whereby a developer portal may be associated with the card system 300.

The card system 300 can crawl and scrape documents collected from web servers. For example, the card system 300 may crawl websites (web applications) and scrape the content from the crawled websites. Additionally or alternatively, the card system 300 may perform static and/or dynamic analysis of a native application to identify the content and/or the layout of an application. Additionally or alternatively, the card system 300 may generate a card dynamically in real-time from the native application or API representing the native application to get up-to-date data from the application. Additionally or alternatively, an application developer or another party may upload documents, templates, layout files, and the like via a developer portal corresponding to the card system 300.

A user device 200 can transmit a card system request 110 to the card system 300. A card system request 110 may include an availability inquiry 112, a card data request 114, and/or state indication data 116. An availability inquiry 112 may be a value that requests the card system 300 to determine whether the card system 300 can return a card object corresponding to a state indicated by the state indication data 116. The state indication data 116 is data that is indicative of a state of an active application being executed by the user device 200. The data included in the state indication data 116 may vary for different implementations or applications. In some scenarios, the state indication data 116 can explicitly indicate the current state of the application. In these scenarios, the state indication data 116 may include a resource identifier that indicates the current state. For example, the state indication data 116 may include a function identifier indicating the state of the software application or an access mechanism, such as a URL or an application resource identifier. In other scenarios, the state indication data 116 may include layout data, UI element data, and/or content data. The layout data may indicate the layout of the current state, such as the locations of text, images, UI input elements, and the like. The UI element data may include data related to the specific UI elements of the current state. The content data may include text and/or images presented by the application at the current state. A card data request 114 may be a request for the card data 124 (as opposed to the availability of the card). The card data request 114 may be transmitted with state indication data 116. The card data request 114 may be transmitted subsequent to the availability inquiry 112 or in lieu of the availability inquiry 112.

The card system 300 operates to handle card system requests 110 from the user devices 200 and to transmit card system responses 120 in response to the card system requests 110. A card system response 120 can include an availability indicator 122 and/or card data 124. In some implementations, an availability indicator is a flag that indicates whether the card system 300 can provide a card corresponding to the state indication data 116 provided in the card system request 110. Card data 124 is data that is used to present a card. Card data 124 may include the content to be displayed in the card. Additionally, the card data 124 may be bound to a layout (e.g., a layout file) that defines the look and feel of the card. The card data 124 may be transmitted with one or more access mechanisms used to access a state of an application represented by the card. An access mechanism is a string or address that an operating system or application can use to set an application to a specific state. Examples of access mechanisms include web resource identifiers (e.g., URLS), application resource identifiers, and scripts.

In response to a card system request 110, the card system 300 may determine whether a card is available for a card system request received from a user device 200. Furthermore, either automatically or in response to a card system request 114, the card system 300 can determine the card data 124 that corresponds to the state indication data 116. The card system 300 may include the card data 124, the layout file, and the access mechanisms used to access an application state corresponding to the card in a card object. A card object is any data structure that stores the card data 124 that a user device 200 uses to generate a card. The card object may be a file, such as a .json file or an XML file. The card system 300 may communicate the card object to the user device in a card system response 120. The user device 200 may then render a card 102 in the target application in response user interactions with the card button.

In some implementations, the user device 200 may send a single card system request 110 and the card system 300 can respond with a single card-system response 120. In these implementations, if a card is available for a given state, the card system 300 can include the card data 124 in lieu of the availability indicator 122. In this way, the user device 200 can treat the card data 124 as an affirmative availability indicator 122. In other implementations, the card system request 110 and/or the card-system response 120 can be broken into multiple separate communications. For example, initially, the user device 200 may transmit a card system request 110 containing an availability inquiry 112 to the card system 300 with corresponding state indication data 116. The card system 300 may respond to the availability inquiry 112 with an availability indicator 122 (e.g., a flag) that indicates whether a card 102 corresponding to the state is available. The user device 200 may visually indicate to the user that the card 102 is available. In response to the user requesting the card 102 (e.g., pressing the card button), the user device 200 may transmit a second card system request 110 to the card system 300 including a card data request 114 and state indication data 116. The card system 300 responds with a card object containing the card data 124 corresponding to the state of the application indicated by the state indication data 116. In some implementations, the card system 300 may respond to a card system request 110 with an access mechanism (e.g., a URL) indicating a location from which the user device 200 may request the card 102.

Figure 2A:
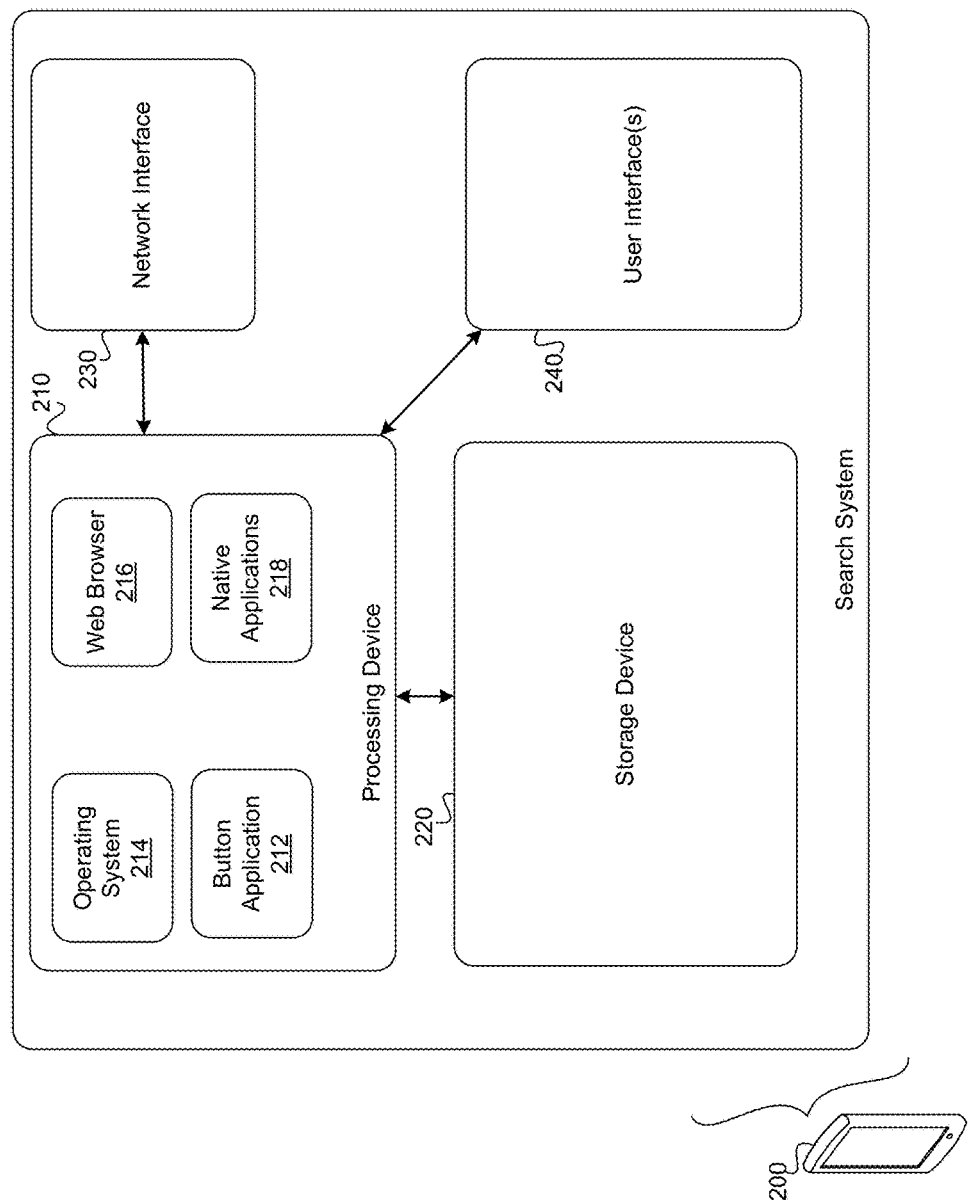
FIG. 2A illustrates an example user device and components thereof.

FIG. 2A illustrates an example user device 200 and an example set of components of the user device 200. In the illustrated example, the user device 200 includes a processing device 210, a storage device 220, a network interface 230, and a user interface 240. The user device 200 may include additional components not shown in FIG. 2. The components of the user device 200 may be interconnected by, for example, a bus or other communication circuitry.

The processing device 210 can include one or more processors that execute computer-executable instructions and associated memory (e.g., RAM and/or ROM) that stores the computer-executable instructions. In implementations where the processing device 210 includes more than one processor, the processors can execute in a distributed or individual manner. The processing device 210 can execute an operating system 214, a button application 212, a web browser 216, and one or more native applications 218.

The storage device 220 can include one or more computer-readable mediums (e.g., hard disk drives, solid state memory drives, and/or flash memory drives). The storage device 220 can store any suitable data that is utilized by the operating system of the user device 200. The storage device 220 can be in communication with the processing device 210, such that the processing device 210 can retrieve any needed data therefrom.

The network interface 230 includes one or more devices that are configured to communicate with the network. The network interface 230 can include one or more transceivers for performing wired or wireless communication. Examples of the network interface 230 can include, but are not limited to, a transceiver configured to perform communications using the IEEE 802.11 wireless standard, an Ethernet port, a wireless transmitter, and a universal serial bus (USB) port.

The user interface 240 includes one or more devices that receive input from and/or provide output to a user. The user interface 240 can include, but is not limited to, a touchscreen, a display, a QWERTY keyboard, a numeric keypad, a touchpad, a microphone, and/or speakers.

The button application 212 may be embodied as a set of computer-readable instructions. The button application 212 can be a stand-alone application that is downloaded (e.g., from the digital distribution platform) and installed on the user device 200. Additionally or alternatively, the button application 212 can be preloaded onto the user device 200 before a user purchases the device (e.g., preloaded by an OEM, such as a telecommunications company). In some implementations, the functionality attributed to the button application 212 herein may be included in one or more native applications 218 included on the user device 212, instead of, or in addition to, being included as a stand-alone application. For example, the functionality of the button application 212 may be provided in a software developer's kit (SDK), whereby application developers can utilize the SDK to include the button application 212 functionality in their respective applications. In some implementations, the button application 212 may be included in the operating system, as a feature included by the operating system provider and/or device manufacturer.

The button application 212 can determine a state of an active application (either native application or a web application). Put another way, the button application 212 captures the state indication data 116 indicating the state of the active application. An active application represents an application (native or web) currently being accessed on the user device 200. The button application 212 can then determine whether the card system 300 can provide a card representing the state of the active application. In some implementations, the button application 212 identifies a resource identifier (e.g., URL or application resource identifier) corresponding to the state of the active application. For example, if the content is provided in an electronic document such as an HTML document, the document may contain a web resource identifier or an application resource identifier tagged in the document. The button application 212 can transmit the resource identifier to the card system 300 in a card system request 110. In some implementations, the button application 212 can capture user interface data, layout data, and/or content data from the current state of the active application, whereby the captured data is indicative of the state. The button application 212 can transmit this data (or a value based on this data) to the card system 300 in the card system request. In response to the card system request 110, the card system 300 returns a card system response 120. The card system response 120 can include an availability indicator and/or card data 124 to render the card.

The button application 212 may display a card button 202 (also referred to as a "button") over the graphical user interface of the active application (i.e., overlaid upon the current state). In some implementations, the button application 212 can alter the appearance of the card button 202 to indicate whether a card is available for the current state. If a card is available and the user selects the button, the button application 212 can obtain and insert the card in a target application. A target application represents another application, which may or may not be running, in which a card can be inserted in response to a user interacting with the card button 202. The button application 212 may insert a card into a default target application or may allow the user to select a target application from a plurality of potential target applications (e.g., native applications 218). In some cases, a plurality of different ones of the additional native applications 218 can be active/target applications depending on what applications the user is using at the current time and what applications the user selects to use as target applications or depending on the current context of what the user is doing, e.g., reading a technology article, playing a game, listening to music or shopping.

Figure 2C:
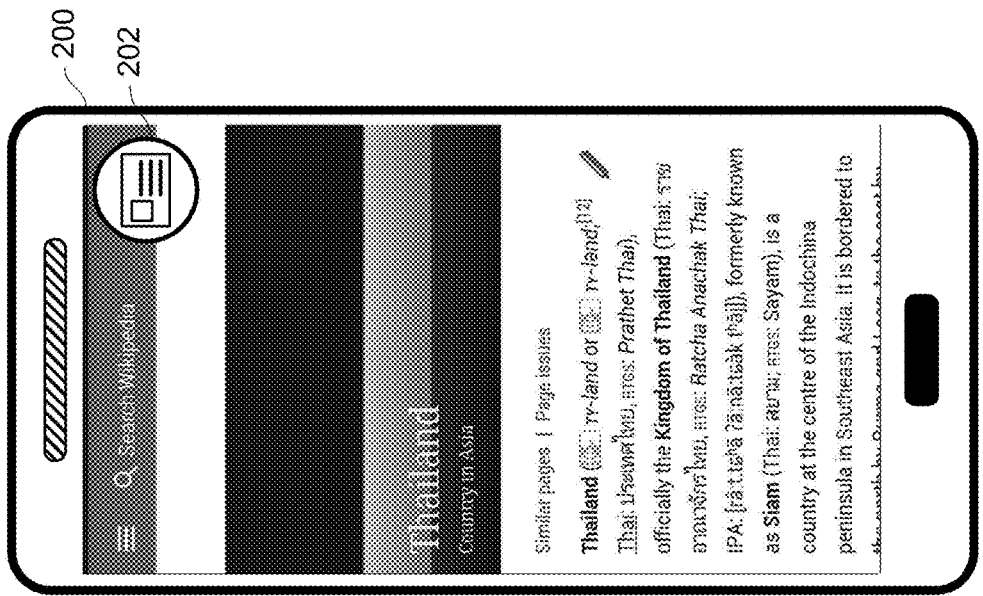
FIGS. 2B-2C illustrate example manners by which a card button may be rendered by a user device.
Figure 2B:
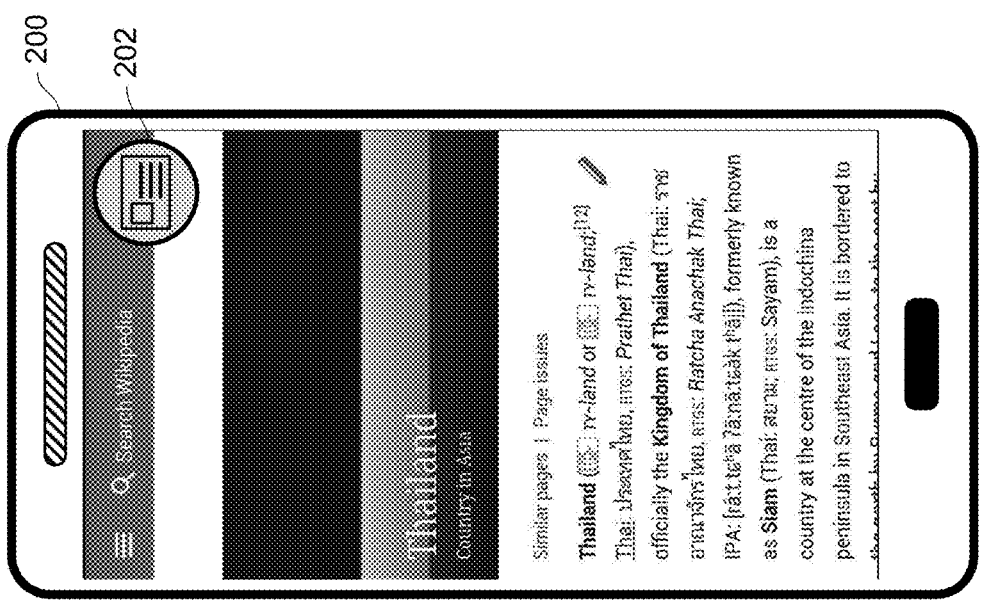

FIGS. 2B-2C illustrate example manners by which a card button 202 may be rendered by a user device 200 to indicate whether a card is available for a current state. In the illustrated examples, the button application 212 can render the card button 202 in an unavailable state or an available state. The example card buttons 202 of FIGS. 2B-2C illustrate whether a card is available from the card system 300 for the current state. In FIG. 2B, the button application 212 renders a grayed out (dim) card button 202, thereby indicating that a card 102 corresponding to the current state is unavailable. In FIG. 2C, the button application 212 renders a lightened (lit) card button, thereby indicating that a card 102 corresponding to the current state is available. Although the availability of the card can be conveyed via darkened/lightened graphical renderings, card availability can be conveyed in other manners, such as using different colors in the card button (e.g., brighter colors when available), different graphics (e.g., different icons), different words in the card button, or different UI experiences (e.g., a vibration or sound for an available card). When a card is available, the user may press on the card button 202 to request the card 102 or to display the card 102 (in the event that a card object is communicated in the card-system response 120.

As previously indicated, the button application 212 inserts a card 102 into a target application. For instance, upon pressing the card button 202, the button application 212 generates the card 102 from card data 124 received in the card system response 120 and inserts the card 102 in the target application. In some implementations, the button application 212 transmits a request for the card data 124 from the card system 300 upon the user selection of the card button 202. In other implementations, the card system 300 transmits the card data 124 automatically upon determining that there is a card available for the current state. In these implementations, the button application 212 may temporarily store the card data 124, such that if the user selects the card button 202 the button application does not need to make an additional card system request 110. If the user transitions to a different state, the button application 212 can discard the card data 124.

Figure 2E:
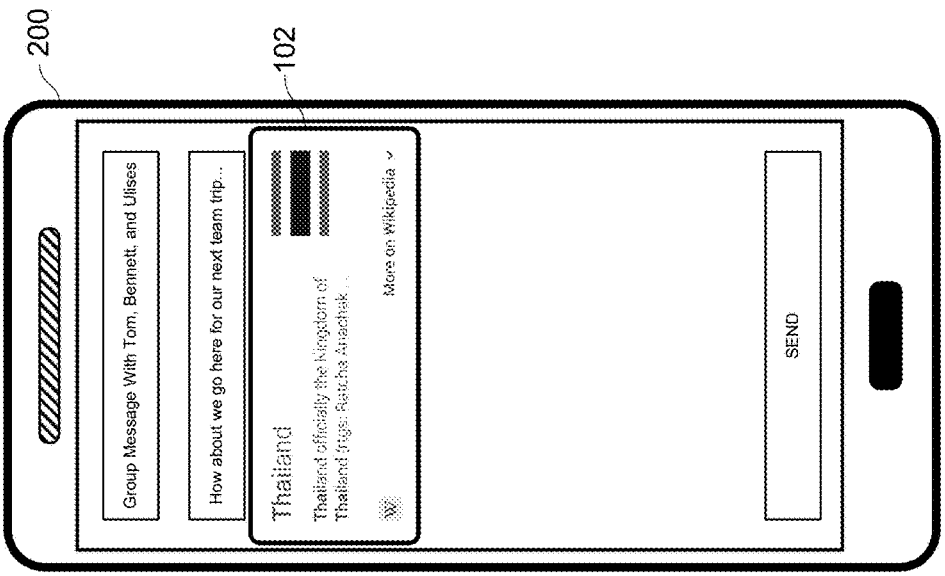
FIGS. 2D-2E illustrate insertion of a card representative of a current state of an active application into a target application via interaction with a card button.
Figure 2D:
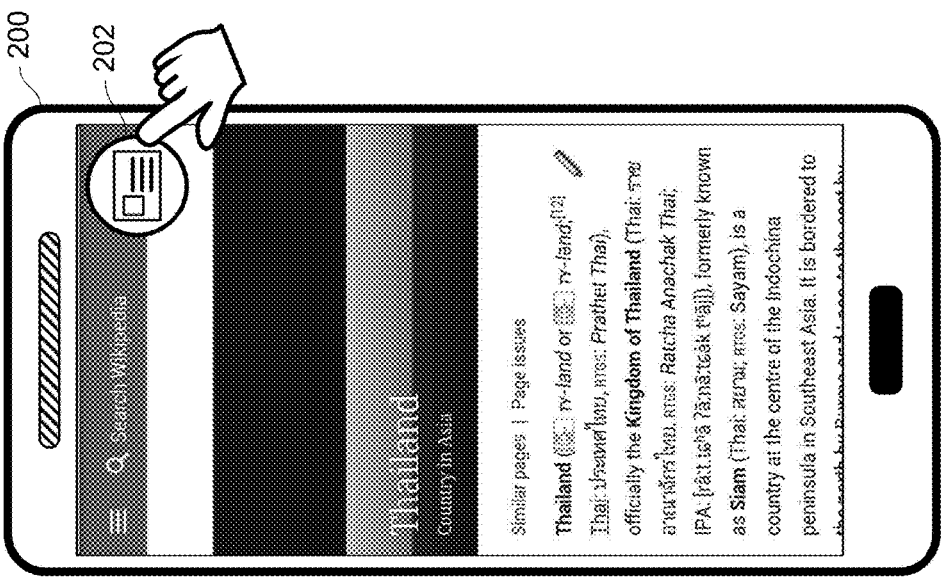

FIGS. 2D-2E illustrate an example insertion of a card 102 representative of a current state of an active application into a target application via interaction with a card button 202. In FIG. 2D, the active application is the WIKIPEDIA native application and the current state is an entry on the country Thailand. The card button 202 indicates that the card system 300 can generate a card 102 for the current state. Put another way, the card system 300 has a record corresponding to the Thailand entry on the WIKIPEDIA application or at the very least templates corresponding to the WIKIPEDIA application that can be populated with information pertaining to the Thailand entry. In response to selecting (e.g., touching) the card button 202, the user device 200 obtains and displays a card 102 from the card system 300. In some implementations, the button application 212 requests the card data 124 corresponding to the Thailand entry from the card system 300. The request includes some indicia corresponding to the Thailand entry. In response to the request, the card system 300 returns a card object containing the card data 124 for the Thailand entry of the WIKIPEDIA application. In response to receiving the user selection of the button 202 and receiving a card object containing card data, the button application 212 may launch a different application and may insert the card in the screen of the different application. For instance, the button application may insert the card 102 into a messaging application (e.g., the SNAPCHAT application or the FACEBOOK MESSENGER application or the device's MMS service or EMAIL application or other near-field communications (NFC) application). In this way, users can share cards with one another. Launching an application by the button application 212 may include the button application 212 instructing the operating system 214 to launch the target application. The button application 212 can then pass the card (e.g., the card object) to the target application, which handles how the card is displayed to the user.

In FIG. 2E, the button application 212 has inserted a card 102 corresponding to the Thailand state of WIKIPEDIA application into the target application (e.g., a messaging application). In this example, the user can send the card 102 to a set of friends using the target application. The card 102, however, may be inserted into other suitable types of applications as well. For example, the card 102 may be inserted into a social networking application, a bookmarking application, or other type of applications, such as email, SMS or device-to-device communications applications.

Figure 2F:
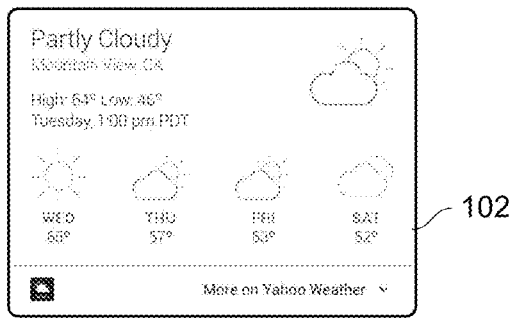
FIGS. 2F-2I illustrate examples of cards that may be inserted into target applications.
Figure 2G:
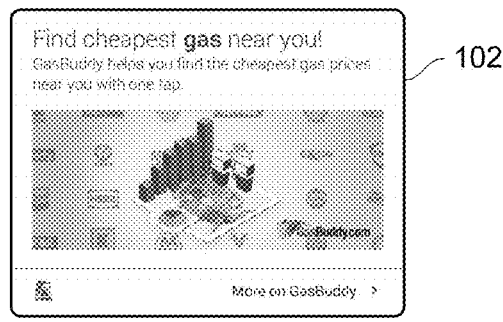
Figure 2H:
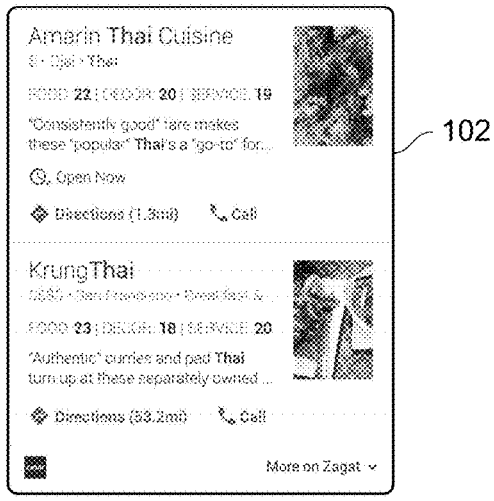
Figure 2I:
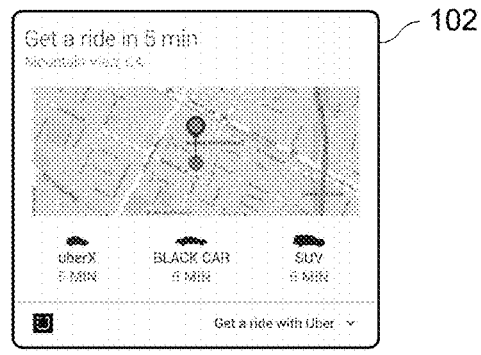

FIGS. 2F-2I illustrate examples of cards 102 that may be inserted into target applications. FIG. 2F illustrates an example card 102A that indicates a state of the YAHOO WEATHER application. FIG. 2G, illustrates an example card 102B that indicates a state of the GASBUDDY application. FIG. 2H illustrates an example card 102C of the ZAGAT application. FIG. 2I illustrates an example card 102D of the UBER application. It is noted that the cards 102 may have other suitable feature and forms. For instance, a card 102 may include input elements that receive input from users. Further, a card 102 may be dynamic, rendered at run-time through direct application access or API access at the target device for the target user when received, or when interacted with.

Figure 2J:
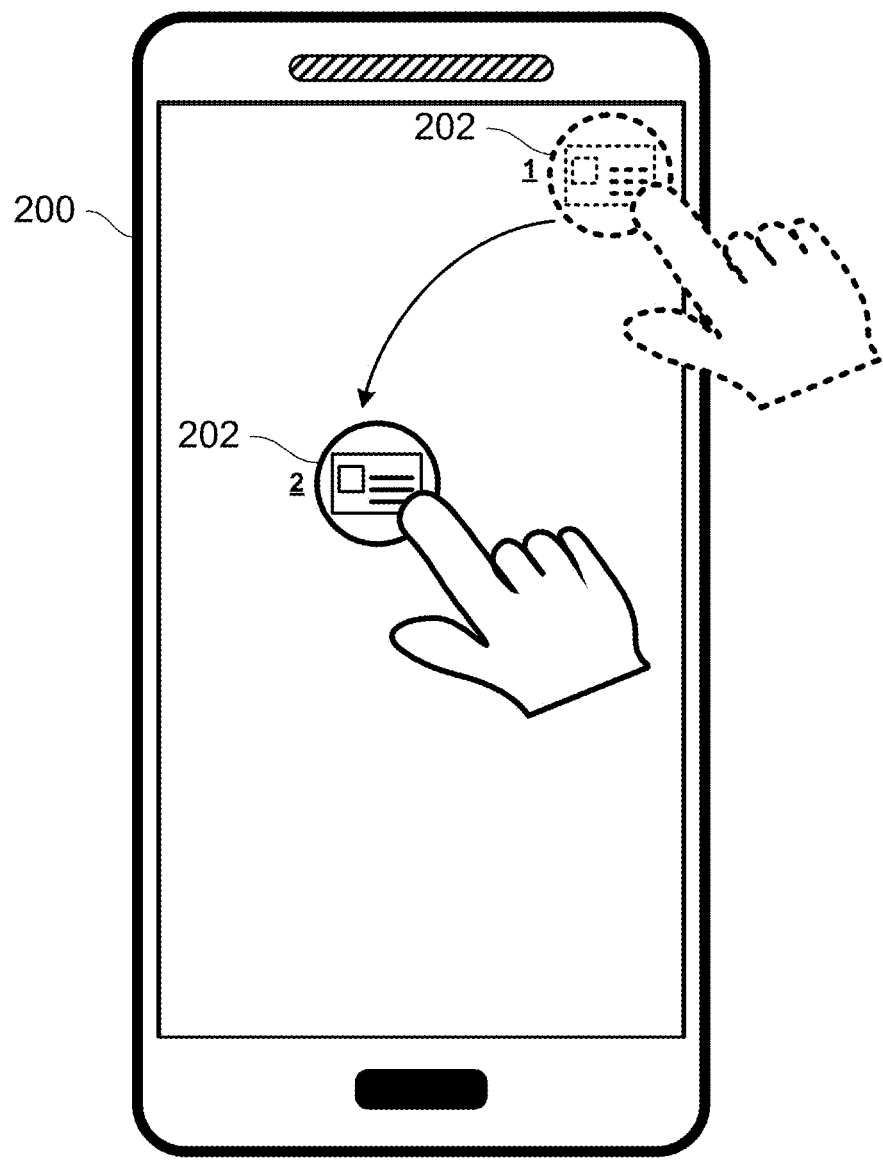
FIGS. 2J-2M illustrate additional aspects of the button application.

FIG. 2J illustrates an additional aspect of the button application 212. In FIG. 2J, the button application 212 renders a card button 202 that is movable by the user. For example, the user may touch the card button 202 at a first location and drag the card button 202 across the screen to a second location, thereby moving the card button 202 to the second location. When the user releases their finger from the second location, the card button 202 may remain in the second location. In this manner, the user may adjust the resting location of the card button 202 to different locations on the screen so that the card button overlays different portions of the underlying current state. A movable card button 202 may provide the user the ability to reconfigure the location of the card button to the user's desired location.

Figure 2M:
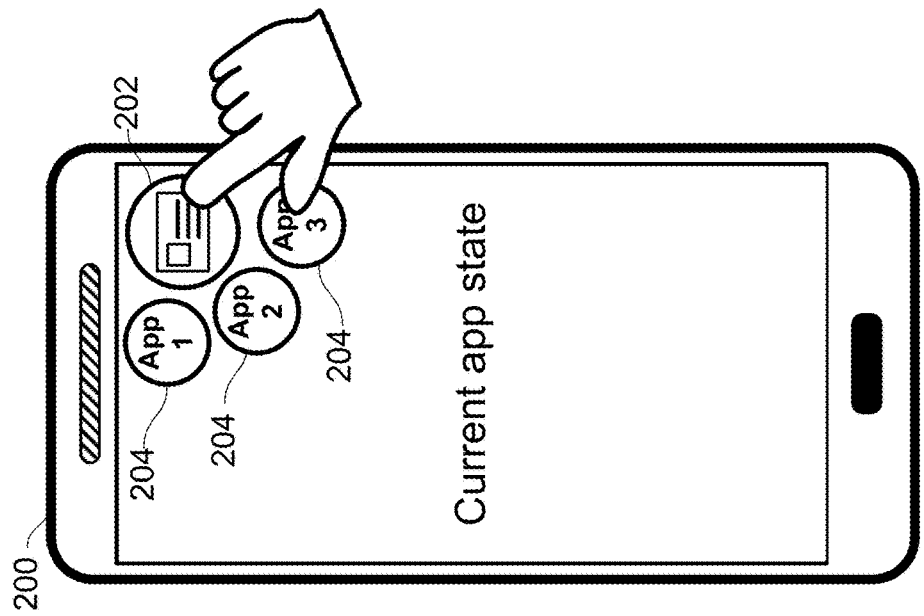
Figure 2L:
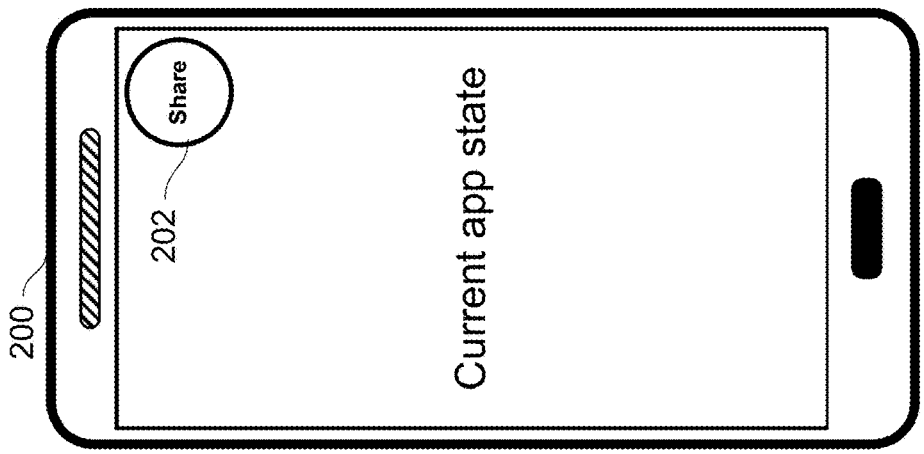
Figure 2K:
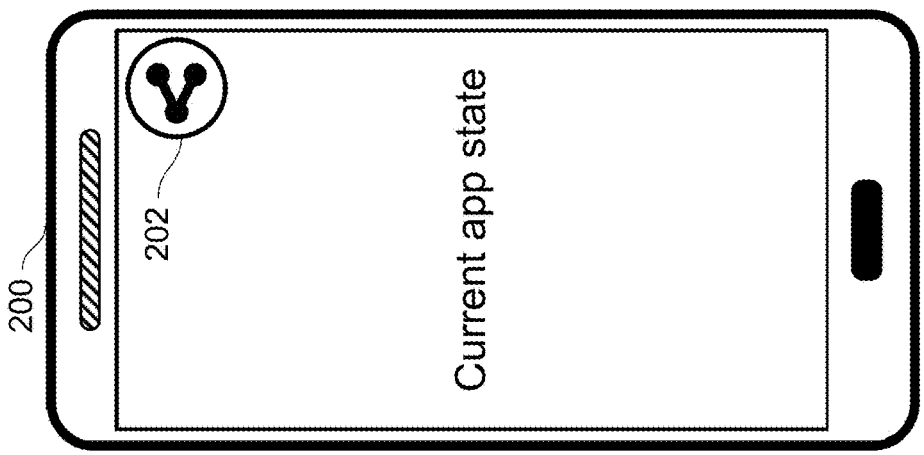

FIGS. 2K and 2L illustrate alternate implementations of the button application 212, and in particular different button graphics. In FIG. 2K, the button application 212 outputs the card button 202 as a share icon. In FIG. 2L, the button application 212 outputs the card button 202 to include the text "Share." The button application may render the buttons in FIGS. 2K and 2L in an available state or an unavailable state, as was described. For example, the buttons may be displayed in a darkened manner when the application is unavailable.

FIG. 2M illustrates example implementations of the button application 212 that allows a user to designate the target application from a set of potential target applications. For instance, the user may select the card button 202 and in response to selecting the card button 202, the button application 212 may present a plurality of target buttons 204. The target buttons 204 indicate applications that the requested card may be inserted into. For example, the card 102 may be insertable into a messaging application, a social media application, and a bookmarking application. Thus, the button application 212 may display target buttons 204 corresponding to the different applications. In this way, when the user selects one of the target application buttons 204, the button application 212 obtains the requested card 102 and inserts the requested card into the selected target application. In operation, the button application 212 can determine the application that was selected by the user and instruct the operating system 214 to launch the selected application. Once the application is launched, the button application 212 can pass the card to the launched application. Furthermore, in some implementations, the target buttons 204 may indicate deeper states of target applications. For instance, the target applications may allow a user to send a card to a specific contact or to store the card in a specific bookmark folder. Further, in some implementations, the list of available applications to select/launch may be based on the current context of the user and the current state. For, example, if the current application is a sports application, the list of target applications can change to include specific social messaging apps, e.g., Facebook Messenger, while if the current context is a technology article, the set of target applications may change to include a different set of apps, such as LinkedIn.

FIG. 3A illustrates a card system 300 and example components thereof. In the illustrated example, for requesting and inserting cards 102 in a target application. In the example of FIG. 3, the card system 300 includes a processing system 310, a storage system 320, and a network interface 340. The card system 300 may include additional components not explicitly shown.

The processing system 310 is a collection of one or more processors that execute computer readable instructions. In implementations having two or more processors, the two or more processors can operate in an individual or distributed manner. In these implementations, the processors may be connected via a bus and/or a network. The processors may be located in the same physical device or may be located in different physical devices. Moreover, the processors may be located at different physical locations. The processing system may execute a card record generation module 312, a card availability module 314, and a card retrieval/generation module 316 (hereinafter "card generation module").

The network interface device 240 includes one or more devices that perform wired or wireless (e.g., Wi-Fi or cellular) communication. Examples of the network interface devices include, but are not limited to, a transceiver configured to perform communications using the IEEE 802.11 wireless standard, an Ethernet port, a wireless transmitter, and a universal serial bus (USB) port.

The storage system 320 includes one or more storage mediums. The storage mediums may be any suitable type of computer readable mediums, including but not limited to read-only memory, solid state memory devices, hard disk memory devices, and optical disk drives. The storage devices may be connected via a bus and/or a network. Storage devices may be located at the same physical location (e.g., in the same device and/or the same data center) or may be distributed across multiple physical locations (e.g., across multiple data centers). The storage system 320 stores a card record data store 322. Example contents of the advertisement data store 320 are discussed in greater detail below.

The card data store 322 can store a plurality of card records 324, each card record 324 corresponding to a different deliverable card 102 or group of cards 102. The card data store 322 may include one or more indexes (e.g., inverted indexes) that index the card records 324.

FIG. 3B illustrates an example of a card record 324. A card record 324 can represent data for one or more potential cards. In some examples, the card record 324 can include data related to a single card 102 (e.g., a single state of an app). In other examples, the card record 324 can include data related to a group of cards 102 (e.g., a card template for a group of different states of an application). For example, one card template can be used for a variety of different related states of an application. In a specific example, one card may have the same layout with different content for different states (e.g., one card layout can be reused for different restaurants in a single restaurant app). In such examples, the card may be populated with content from the different states to represent the respective states.

The card record of FIG. 3B includes a card record ID 326, an app ID 328, state information 330, layout and UI element data 332, an access mechanism 334/template 335, and card data 336/card template data 337. The card record ID 326 may be any value or string that uniquely identifies the card record 324 in the data store 322. The application ID 328 indicates the application with which the record is associated. The application ID 328 may include the name of the application or a numerical value that maps to the application.

The state information 330 can include text, images, or other data related to an application state (i.e., the state associated with the card). The state information 330 includes text and/or images that are presented to the user when the user is in the application state. The state information 330 may be obtained from a document representing a state (e.g., an HTML document) by scraping the document. The state information 330 may be structured or unstructured data. The state information 330 may further include a title of the state. For instance, if the state corresponds to a news article, the state information 330 may include the title of the application. In this way, a card corresponding to the news article, may include the title of the application state. The sate information 330 may be scraped from the application (e.g., from a document representing the state) or may be uploaded to the card system 300 by the developer of the application via a portal.

The card record 324 can include layout and UI element data 332. The layout and UI element data 332 can describe the arrangement of the graphical user interface of the application to which the card record 324 corresponds. In particular, the layout and UI element data 332 can define the location of objects (e.g., where text or images appear) when presented in the state as well as the type and location of the UI input elements when presented in the state. The layout and UI element data 332 can also include text and other data associated with UI elements, such as text associated with buttons, labels, text boxes, etc. Before receiving card system requests, the card system 300 (e.g., the card record generation module 312) can retrieve (e.g., crawl/scrape) the data for the card records 324 from the applications. The card record generation module 312 may also analyze the applications (e.g., using static/dynamic analysis) in order to determine the layout and UI elements for the states of the applications. The combinations and arrangements of the UI elements and other data related to the UI elements make a fingerprint for identifying the current state. In some implementations, the card record generation module 312 includes layout and UI element data 332 in the card record 324, whereby the layout and UI element data 332 can be used to match the respective card record 324 to state indication data 116 received with a card system request 110. In some implementations, the layout and UI element data 332 may be a value that is indicative of arrangement of the graphical user interface. For example, the layout and UI element data 332 may be a hash value that is the output of a low collision hash function that receives the layout and UI element data 332 and outputs a unique (or likely unique) value based thereon. In these implementations, the card record 324 may be indexed by the value.

The card record 324 may include one or more access mechanisms 334 and/or one or more access mechanism templates 335. As previously discussed, the access mechanisms 334 may include web resource identifiers, application resource identifiers, and/or scripts. The access mechanism 334 can be used (e.g., by the user device) to open the application state. In cases where the card record is for a single application state, the card record 324 may include a single access mechanism 334 (or multiple access mechanism s for the same state for different platforms). In cases where the card record 324 is for multiple application states, the card record 324 may include an access mechanism template 335 that can be used to generate different access mechanism 334. For example, an access mechanism template 335 may have parameter fields that receive values in order to form a complete access mechanism 334. In a specific example, a URL template for the IMDB application may be http://www.imdb.com/title/{movieID}. In this specific example, inserting a movieID may complete the access mechanism template 335, thereby forming an access mechanism 334. An example access URL for the particular feature film on IMDB application is: http://www.imdb.com/title/tt0096895/, where tt0096895 is the movieID. In this example, the value tt0096985 may be used to generate the URL given the template. Although HTTP web URLs are given as examples above, other types of access URLs that are app/platform specific (e.g., Android/iOS specific) can be used. In some implementations, the card record 322 can include template rules for filling out the templates 335 based on data included in the card system request (e.g., in the state indication data).

The card record 324 includes card data 336 and/or card template data 337. The card data 336 includes the content used to render the card 102 in the target application, such as text and images. The card data 336 may include content that is presented at a state of an application. For example, the card data 336 may include a name of the application, a title of the state, a text snippet from the state of the application, images presented at the state of the application, and/or an icon of the application. As opposed to the state information, which may include content from the state of the application that is not presented, the card data 336 includes the content that is presented in a rendered card 102.

The card template 337, when present, may be filled in to generate a card. Put another way, the card template 337 defines the layout of the card. The layout may be defined in a layout file and binding. The layout file defines where each element appears in a rendered card. For example, the layout file may define the location of the title of a state, the location of an icon of the application, and locations of text and/or images presented in the card. In this way, the card template 337 defines the look and feel of the card 102. The binding can define the data types that are received by the layout file. The card system 300 can utilize the binding to bind the text, images, and access mechanisms that correspond to a state to the card template 337, thereby generating a card object containing card data 124. In some implementations, the layout file may further define UI input elements appearing in the card, whereby the cards served by the card system 300 can include input elements. In this way, the card system 300 can serve cards that link to dynamic application states. The card generation module 316 can generate a card object based on the card data 336 and/or the card template data 337.

In some implementations, the record generation module 312 generates the card records 324 based on data obtained from the data sources 150. Data sources can include web servers, application servers, and/or developer portals, whereby a developer portal may be associated with the card system 300. The record generation module 312 can actively collect data from a data source 150 (e.g., from a web server or applications server) and/or can passively receive data from a data source (e.g., from application developers via a developers portal). For example, the record generation module 312 may employ a collection of web crawlers that crawl applications. In some implementations, the crawlers can systematically identify documents (e.g., states) to request from applications (e.g., web servers or application servers). The applications (e.g., web servers or application servers) return the requested documents. In these implementations, the record generation module 312 identifies the access mechanism corresponding to requested document with the requested document. Furthermore, the record generation module 312 scrapes the document, thereby obtaining the data comprising the state information 330 and/or the card data 336. The record generation module 312 may utilize a known schema to parse and scrape the document, whereby the scraped data may be used to structure the state information 330 and/or the card data 336 in the card. For example, the record generation module 312 can determine the title, the images, icons, and other content from the tags in the requested document and the content following the tags. In the even the document corresponds to a newly discovered application state, the record generation module 312 can create a new card record 324 and include the scraped data in the card data 336 and/or the state information of the new card record 324 and the corresponding access mechanisms in the new record 324. In the event the application state is a previously known application state, the record generation module 312 can update a previously generated card record 324 with the scraped data. The record generation module 312 can utilize default card templates when the content is obtained by crawlers.

Additionally or alternatively, the record generation module 312 may connect to a portal where developers may upload their content to the portal. In doing so, the developers can provide one or more documents and access mechanism(s) corresponding to each document, whereby an access mechanism defines the location from which the document may be retrieved. In this way, the record generation module 312 can determine the state information 330 and the access mechanisms 334. Furthermore, the developer can define which content is to be included in the card data 336. Application developer may also provide layout templates and/or access mechanism templates. In this way, the application developer may have control over the content displayed in the card and/or the look and feel of the card.

The record generation module 312 may implement additional or alternative techniques to obtain content to populate the card data store 322. For example, the record generation module 312 may perform static and/or dynamic analysis of a native application to identify the content and/or the layout of an application. The record generation module 312 generates card records 324 based on the collected data.

The card availability module 314 and the card generation module 316 can operate to handle card system requests 120 from the user devices 200 and to transmit availability indicators 122 and/or card data 124 of available cards 102 to the requesting user devices 200. The card availability module 314 determines whether card data 124 corresponding to state indication data 116 is available in response to a card system request 110 received from a user device 200. The card generation module 216 can generate a card object in response to a card data request 114. A card object is any data structure that stores card data 124 that a user device 200 uses to generate the card 102. A card object can include instructions and/or data for rendering the card 102 (e.g., a layout file with the card data 124 bound thereto), content that is to be displayed in the card 102, and/or one or more access mechanisms for accessing a represented state of an application. The card generation module 316 can transmit the card object to the user device 200. The user device 200 may then render a card 102 in the target application in response user interactions with the card button.

In operation, the card availability module 314 receives a card system request 110 from the user device 200. The card system request 110 may include an availability inquiry 112 and state indication data 116. The availability inquiry 112 may be a value that indicates that the request is for a determination as to whether a card 102 can be delivered corresponding to a state indicated by the state indication data 116. The state indication data 116 may be a resource identifier (e.g., a URL or an application resource identifier) or may be a combination of layout data and/or UI data. In the latter scenario, the layout data and/or UI data may be used to identify states of applications when the operating system does not allow the button application 212 access to the resource identifier of the active application.

In response to receiving an availability inquiry 112 and state indication data 116 in the card system request 110, the card availability module 314 determines whether the card generation module 316 can provide a card 102 corresponding to the state indicated by the state indication data 116. The card availability module 314 searches the card record data store 322 using the state indication data 116.

In some implementations, the card availability module 314 searches the card record data store 322 by querying an inverted index that indexes the card records 324. The term inverted index may refer to any suitable inverted index and/or other mapping mechanisms that map a key value to one or more card records 324. In some implementations, the inverted index may be keyed by resource identifiers. In these implementations, the card availability module 314 queries the inverted index using a resource identifier indicated by the state indication data 116. In this way, the card availability module 314 can determine whether a card corresponding to the current state of the active application can be delivered to the user device 200. Additionally or alternatively, the inverted index may be keyed by values corresponding to layout data and UI data. In these implementations, the state indication data 116 may include the layout data and UI data or a value that represents the layout data and UI data. In implementations where the state indication data 116 includes a value that represents the layout data and the UI data, the value may be the output of a hash function that receives the layout data and the UI data and generates a value based on the layout data and UI data. Alternatively, the card availability module 314 may receive the layout data and the UI data and may feed the layout data and UI data to the hash function. The hash function outputs a value, which the card availability module 314 can use to query the inverted index.

The inverted index outputs a card record ID 326 of a card record 324 if the state indication data 116 corresponds to a known state. In such a scenario, the card availability module 314 can provide an affirmative availability indicator 122 in a card system response 120 to the user device 200. In this way, the card system response 120 indicates to the user device 200 that a card is available for the state indicated by the state indication data 116. In some implementations, the availability indicator 122 may be a flag in the card system response 120 that is set to a value (e.g., TRUE) if a card is available. As discussed, the button application 212 can utilize the availability indicator 122 to adjust the appearance of the button 202 displayed at the user device 200. If the inverted index does not output a card record ID, the card availability module 314 determines that the card system 300 cannot output a card to the user device 200. In this scenario, the card availability module 314 can include an availability indicator that indicates that the system 300 cannot transmit a card corresponding to the state indication data 116.

In some implementations, when a card is available the card generation module 316 generates a card object corresponding to the state indication data 116 and transmits the card object in the card system response message 120 that is responsive to an availability inquiry 112. In other implementations, the card generation module 316 receives a secondary card system request 110 including a card data request 114 when the user selects a button 202 displayed by button application 212 executing on the user device 200. The secondary card system request 110 includes the state indication data 116 and a card data request 114. In response to the card data request 114, the card generation module 316 generates a card object corresponding to the state indication data 116 and transmits the card object to the user device 200.

In generating a card object, the card generation module 316 can instantiate a new card object from a card object template. The card object may be a container such as a .JSON file or an XML file. The card generation module 316 retrieves the card record 324 corresponding to the state indication data 116 from the card record data store 322. In some implementations, the card generation module 316 can obtain the card data 336 from the card record 324. The card generation module 316 also obtains the card template (e.g., a layout file and binding) from the card record 324. The card generation module 316 may bind the card data 336 to the card template 337. For example, the card generation module 316 may bind the card data 336 to a layout file using a binding. The card data 336 may define the content that is presented in the card and the layout of the card, which defines where and how the content is presented. The card generation module 316 encodes the card data 336 and the card template into the new card object. Additionally, the card generation module 316 may obtain the one or more access mechanisms 334 defined in the card record 324. The card generation module 316 can encode the access mechanism(s) into the new card object. The card generation module 316 can provide the card object to the user device 200. The card generation module 316 may include the card object in a card system response 120. The card system 300 may transmit the card system response 120 to the user device 200 or to an intermediate device, which in turn transmits the card system response 120 to the user device 200.

Figure 4A:
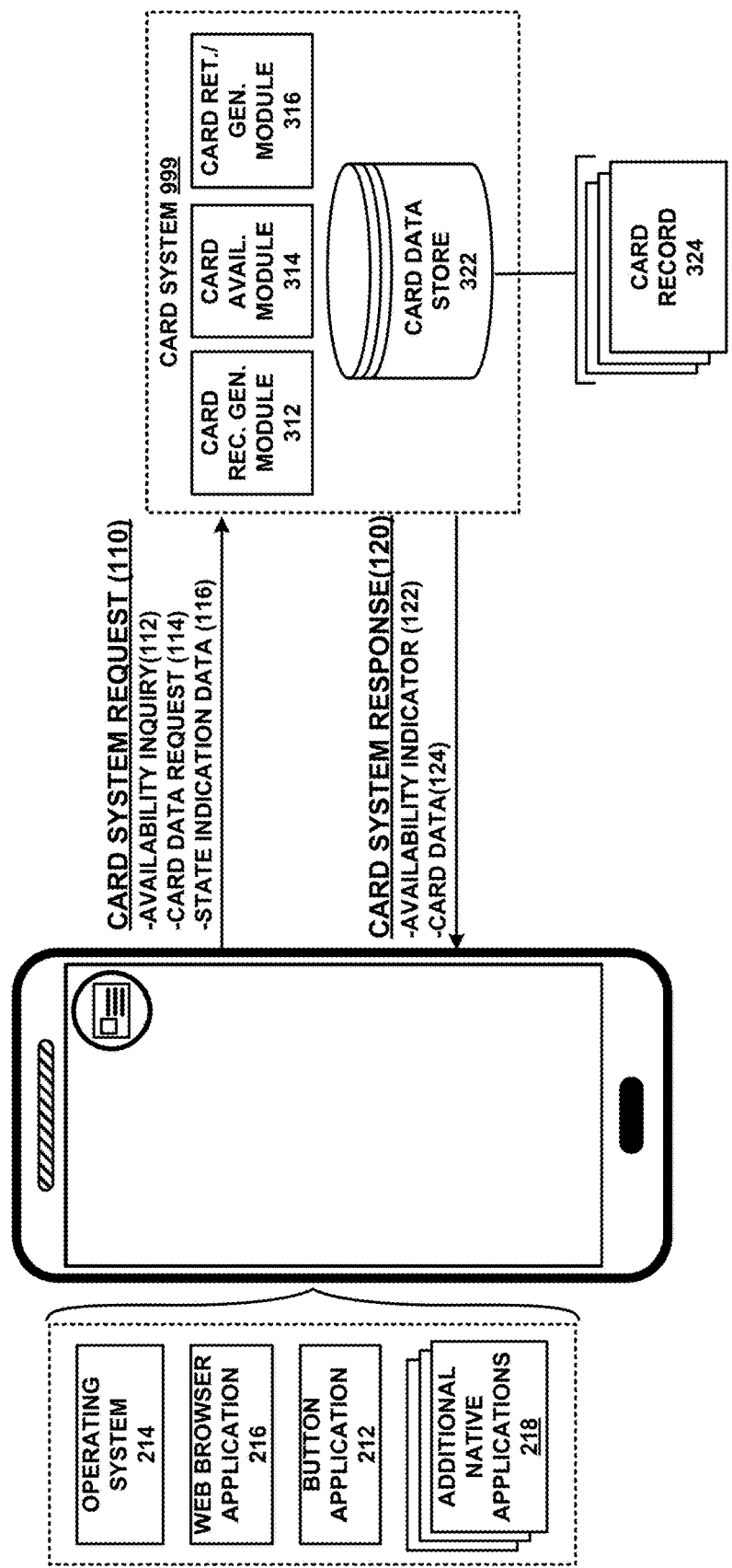
FIGS. 4A-4C illustrates examples of a user device and a card system interacting according to various implementations of the present disclosure.
Figure 4B:
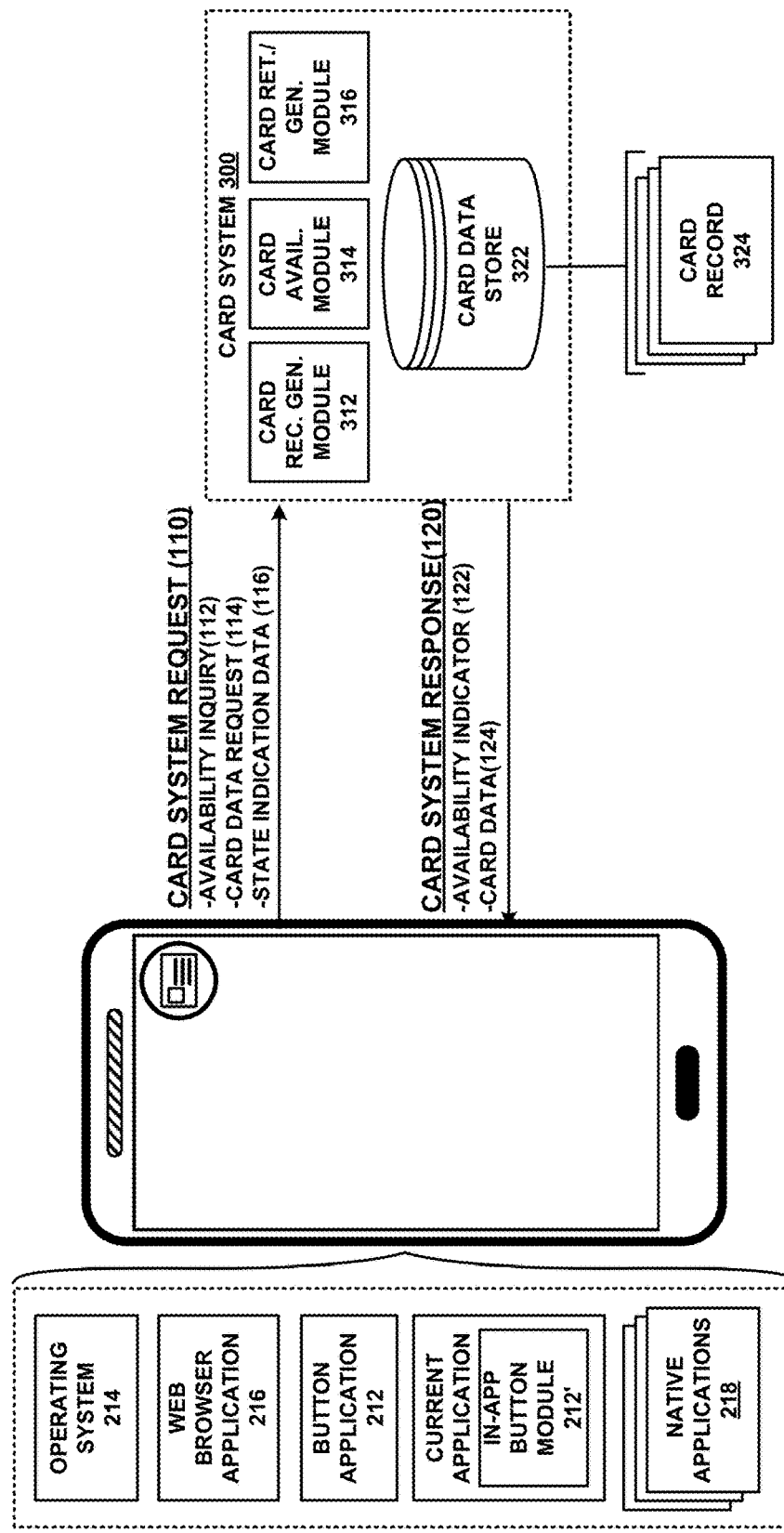
Figure 4C:
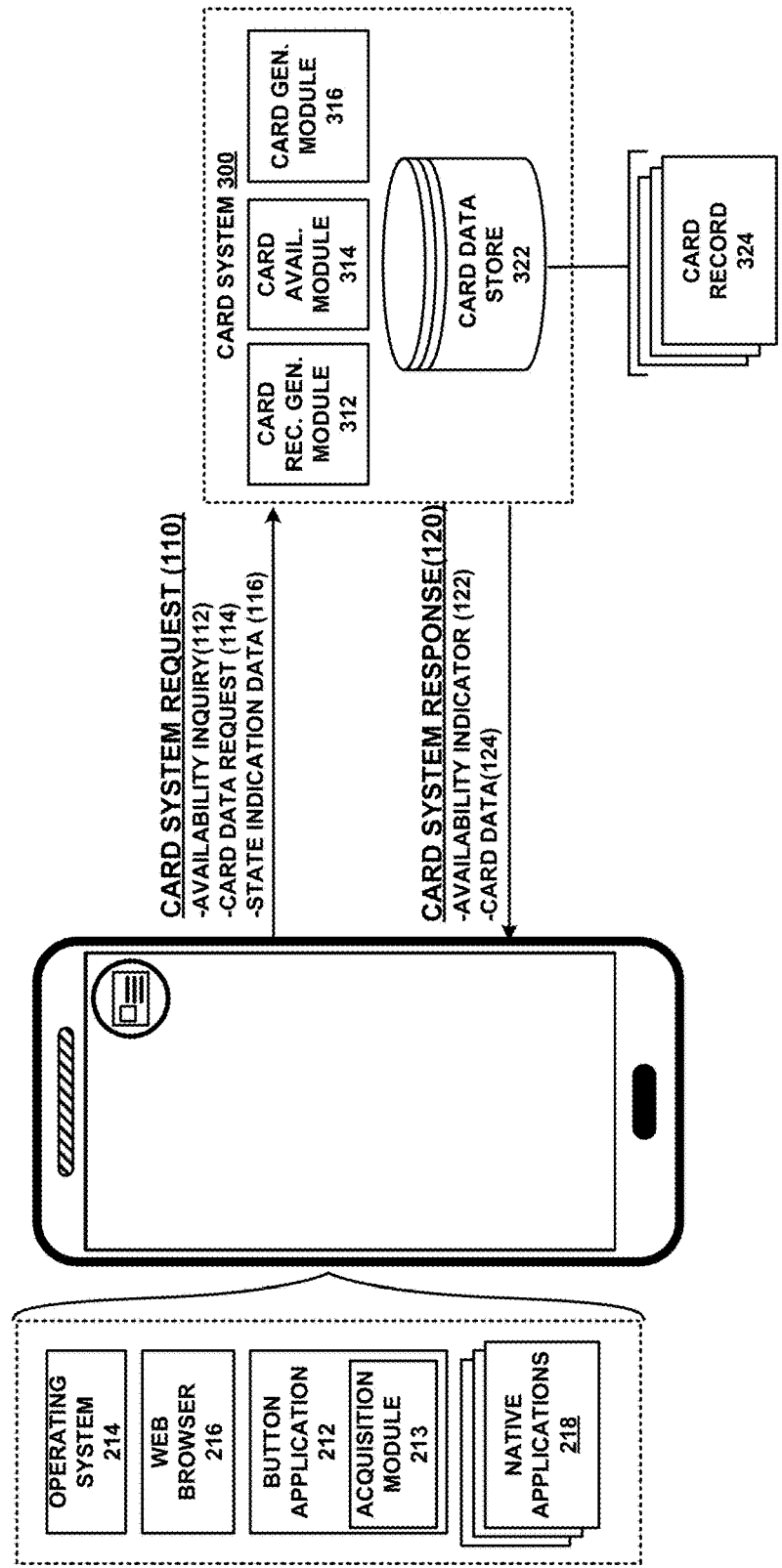

FIGS. 4A-4C illustrate example implementations of the card system 300 and button application 212. In FIG. 4A, the user device 200 executes a button application 212, which transmits a card system request 110 and receives a card system response 120. The card system request 110 includes state indication data 116 corresponding to a current state of an accessed application. The card system request 110 may further include an availability inquiry 112 and/or a card data request 114. The card system 300 determines whether it can deliver a card corresponding to a state indicated by the state indication data 116. The card system 300 transmits a card system response 120 that may indicate the availability of a card for the current state and/or include a card object containing card data 124 and one or more access mechanisms. The card-system response 120 may include an availability indicator 122 indicating whether a card 102 is available for the current state. In some implementations, the card system response 120 may include either additionally or in lieu of the availability indicator, a card object corresponding to the state indication data. In this way, the card system 300 only issues a single card system response 120 in response to a single card system request 110. Upon receiving an affirmative card system response with a card object, the button application 212 may adjust the button 202 to indicate that the user may insert the card 102 to a target application. Furthermore, the button application 212 may temporarily cache the card object, such that if the user selects the displayed button 202, the button application 212 may insert the card into the target application.

In some implementations, the card system request 110 and/or the card-system response 120 can be broken into multiple separate communications. For example, initially, the user device 200 may transmit an availability inquiry 112 and state indication data 116 to the card system 300. The card system 300 may respond to the availability inquiry 112 with a card system response 120 that includes an availability indicator 122 (e.g., a flag) that indicates whether a card 102 corresponding to the state is available. The user device 200 may visually indicate to the user that the card 102 is available. In response to the user requesting the card 102 (e.g., pressing the card button), the user device 200 may transmit a card system request 110 including a card data request 114 and state indication data 116 to the card system 300. The card system 300 may respond with a card object corresponding to the state of the application In some scenarios, the button application 212 has permissions to determine the current state of an active application running on the user device 200. For example, the button application 212 may determine the state of the active application from the operating system 214 or the application itself. FIG. 4B illustrates a system for requesting and inserting cards into a target application according to some implementations of the present disclosure. In the example of FIG. 4B, a native application 218 may include an in-app button module 212' that identifies the current state of the active application on the user device 200. In some implementations, the in-app button module 212 may be included in a software developer's kit (SDK) and made publically available by the developer or maintainer of the card system 300. An application developer can include the in-app button module 212' in its respective application(s). The in-app button module 212' includes instructions that request an access mechanism (e.g., a resource identifier) corresponding to the current state. The request can be handled at the application level or the OS level. The in-app button module 212' passes the resource identifier to the button application 212. The button application 212 may include the resource identifier with the availability inquiry 112 in the card system request 110, as was described above.

In some scenarios, the button application 212 may be unable to obtain resource identifiers indicating the state of an application. For example, an application may not include an in-app button module 212'. In such a scenario, the button application 212 may not be able to obtain resource identifiers indicating the state of the application because the button application 212 does not have adequate permissions to obtain the resource identifiers (e.g., the run-time environment of the applications is silo'd into containers). In such scenarios, the button application 212 may capture information corresponding to the presentation of the active application. FIG. 4C illustrates a system for requesting and inserting cards into a target application without the use of resource identifiers in the state indication data 116. In the illustrated example, the button application 212 may include an acquisition module 213 that captures data indicating a layout of the active application, the input elements presented by the active application, and/or the content presented by the active application.

In some implementations, the acquisition module 213 may obtain a document corresponding to the state (e.g., a JSON file and/or a markup file). In this example, the JSON file or markup file defines the layout of the state, the user input elements displayed in the state, and the content presented in the state. In this way, the document is a fingerprint that identifies the state. The acquisition module 213 can transmit this document to the card system 300. Additionally or alternatively, the acquisition module 213 may calculate a value representing the state of the active application based on the contents of the document. For example, the acquisition module 213 may hash some or all of the contents of the document to obtain a hash value. For example, acquisition module 213 may parse the document to identify certain tags or fields in the document. The acquisition module 213 may scrape the data that is defined within the tags or in the fields. The acquisition module 213 may then feed the scraped data into a function (e.g., a hash function) that outputs a value based on the inputted scraped data. The value that is output may be a unique value that identifies the state from other states. The button application 212 may transmit the value representing the state to the card system 300, as was described above.

In other implementations, the acquisition module 213 captures a screenshot of the active application. The screenshot may be analyzed to determine the layout, the user input elements, and/or the content. For example, the acquisition module 213 may perform optical character recognition and/or pattern matching on the screenshot to determine the layout, user input elements, and/or the content. The button application 212 can include the results of the analysis as the state indication data 116. Alternatively, the button application 212 may transmit the actual screenshot as the state indication data 116.

Additionally or alternatively, the acquisition module 213 can acquire data regarding the layout of the current application state and the UI elements in the current application state. In some implementations, the acquisition module 213 can acquire the data in response to transitioning to the current state. On the ANDROID operating system 214, the acquisition module 213 can utilize the ANDROID Accessibility Framework to determine the layout and the UI elements of the current application state.

In FIGS. 4A-4C, the button application 212 transmits the card system request 110 to the card system 300. The card system 300 returns the card-system response 120. The button application 212 receives the card-system response 120. In some implementations, the card-system response 120 includes an availability indicator 122. The availability indicator 122 indicates whether a card corresponding to the identified state is available. If so, the button application 212 can display the card button 202 in a manner that indicates that the card is available. If not, the button application 212 can display the card button 202 in a manner that indicates that no card is available, or may not display a card button 202 at all. Furthermore, in some implementations, the card-system response 120 includes the actual card data 124, which can be used to render a card. In these implementations, the button application 212 may temporarily store the card data 124 in case the user selects the card button 202. If the user selects the card button 202, the button application 202 may insert the card into a target application. If the user transitions states or to a different application without selecting the card button 202, the button application 212 can discard the card 102.

Figure 5:
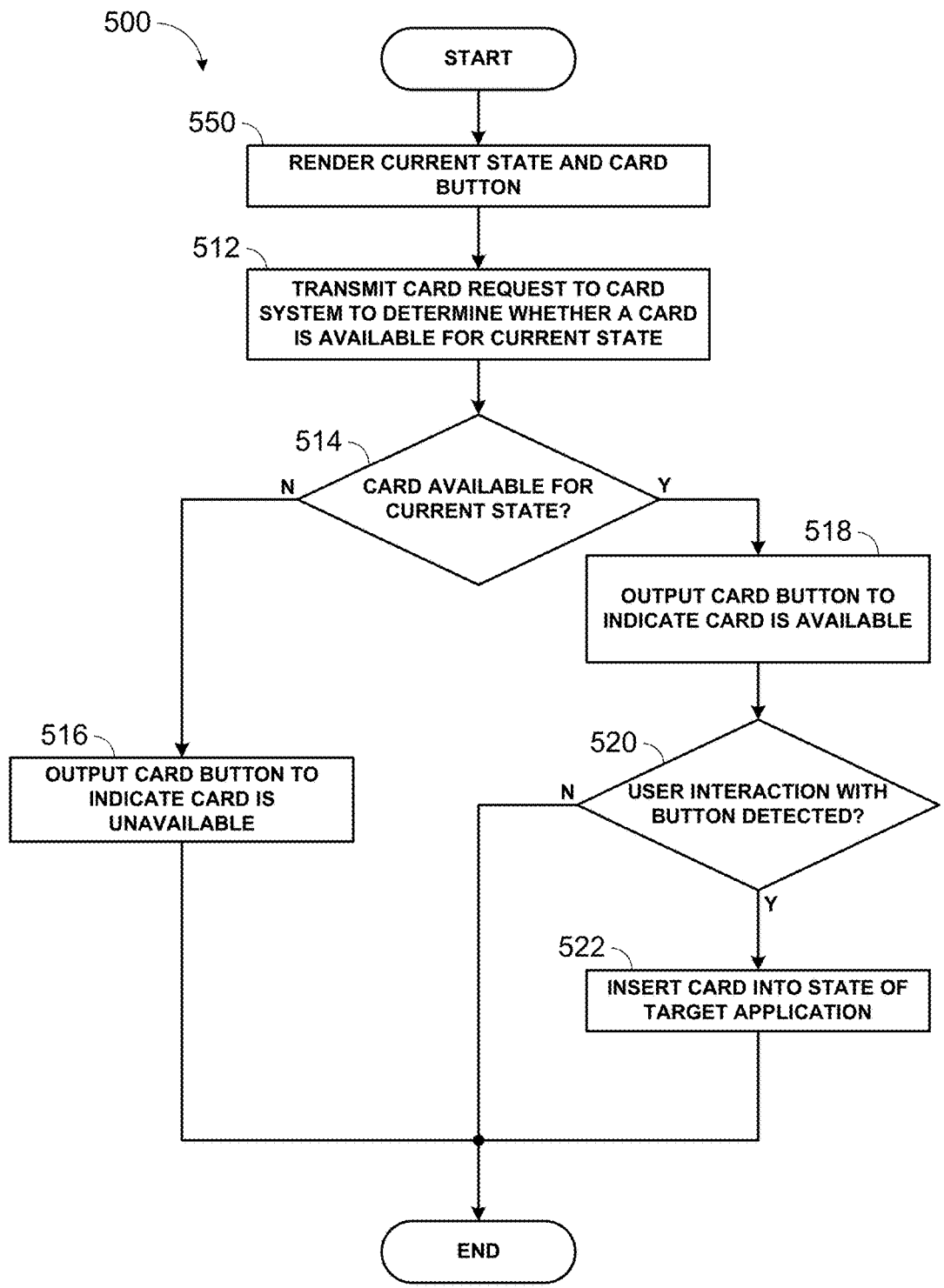
FIG. 5 illustrates a set of operations of a method for inserting a card in a target application.

FIG. 5 illustrates an example set of operations of a method 500 for inserting cards in a target application. The method 500 is discussed with respect to the user device 200 and the card system 300 described above. The method 500 may be performed by other systems as well.

At operation 510, the user device 200 renders a current state of an active application and the card button 202. Typically, the user device 200 renders the current state in response to a user command. For instance, a user may command the user device 200 to transition states within an application or may switch applications altogether. In one example, a user may be reading a first article on a news application and may switch to another article. In another example, a user may be searching for flights on a travel application. In response to entering the search parameters (e.g., airport codes and dates) and entering "search," the travel application may switch from a search state to a result page state, where the user can see the various flight options. In another example, the user may select a search result and may be linked to a state of an application. When the application transitions states, the button application 212 outputs a card button 202 on the screen of the user device 300. For instance, the button application 212 may overlay the card button 202 onto the GUI of the active application as shown in FIG. 2B.

At operation 512, the button application 212 sends a card system request 110 to the card system 300. The card system request 110 may include state identification data 116. The card system request 110 requests a determination as to whether the current state of the active application may be represented by a card 102. In some implementations, the button application 212 communicates with an in-app button module 212' (FIG. 4B) embedded in the active application. In these implementations, the in-app button module 212' may obtain a resource identifier (e.g., a web URL or an application resource identifier) and may pass the resource identifier to the button application 212. The button application 212 may include the resource identifier in the card system request 110 as the current state indication data 116.

In some scenarios, the button application 212 does not have access to resource identifiers of the active application. For instance, the button application 212 may not have sufficient permissions to obtain the resource identifier of a current state of an active application. In these scenarios, an acquisition module 213 (FIG. 4C) obtains layout and UI element data indicating the current state. In some implementations, the acquisition module 213 obtains a document representing the state of the active application. This may be received directly from the active application is the active application includes instructions (e.g., from an SDK) to report the document to the acquisition module 213. In some implementations, the button application 212 may receive the document from the operating system. The document may be a JSON file or a markup document that indicates the layout, the user interface elements, and/or the content of the state. The document itself, or a value representing the document (e.g., a hash value), may comprise the state indication data 116. Alternatively, the layout and UI element data may include a screenshot of the current state and/or a description of the layout and UI elements of the current state. The description and/or screenshot may be included in the card system request 110 as the current state indication data 116. In some implementations, the button application 212 can utilize the ANDROID accessibility framework to determine the layout and the UI elements of the current application state. Furthermore, while in some implementations the button application 212 may include raw layout data, UI element data, and/or content data in the state indication data 116, the button application 212 may calculate a value based on the layout data, UI element data, and/or content data. The button application 212 may include the calculated value in the state indication data 116.

At decision box 514, the button application 212 determines whether a card 102 for the current state of the active application is available. The button application 212 may receive a card-system response 120 that includes an availability indicator 122. If the availability indicator 122 indicates that a card 102 corresponding to the state is not available, the button application 212 displays the card button 202 in a manner that indicates that a card 102 is not available to the current state, as shown at operation 516. For example, the card button 202 may be displayed in a lightened manner or in a blurry manner. If the availability indicator indicates that a card is available, then the button application 212 may display the card button 202 in a manner that indicates that the card is available, as shown at operation 518. For instance, the card button 202 may be displayed in color or with a brighter appearance. At decision 520, the button application 212 determines whether the user selects the button 202. In some implementations, the button application 212 may transmit a card system request 110 including a card data request 114 and the state indication data 116 determined at operation 512. The card system 300 returns a card system response 120 with the requested card data 124 in response to the card system request 110. It is noted that in some implementations, the button application does not issue a second card system request 110; rather, the card system 300 includes the card data 124 with the availability indicator 122 or in lieu of the availability indicator 122 in the card system response 120. The card data 124 may include the data used to display the card 102 representing the state of the active application. If the user selects the card button 202, the button application generates the card 102 based on the card object and inserts the card 102 in an application, as shown at operation 522. For example, the generated card may be inserted in a social media application, a bookmarking application, and/or a messaging application. In some implementations, the button application 212 can access an API of the target application to insert the card 102 to the target application.

Figure 6:
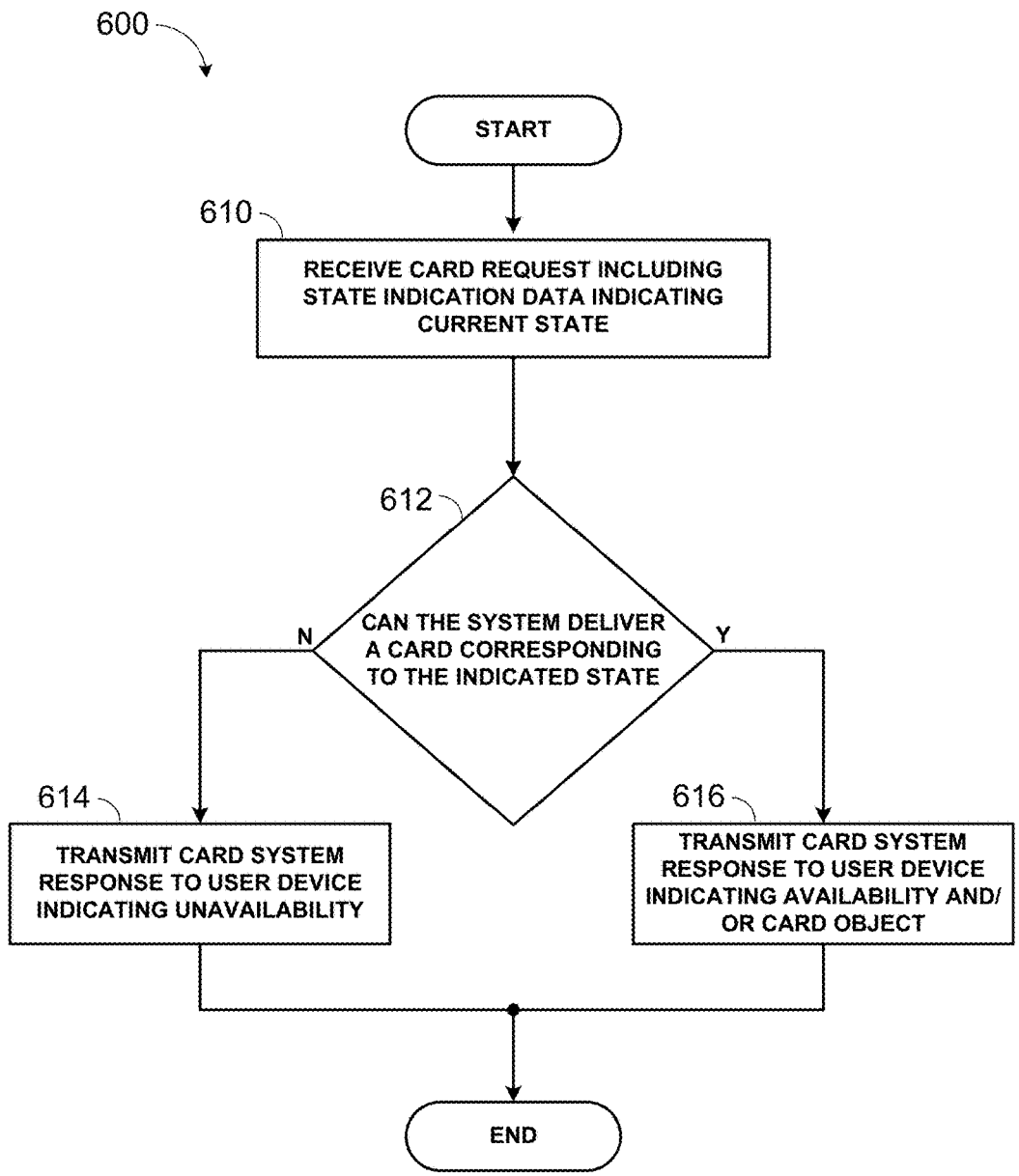
FIG. 6 illustrates a set of operations of a method for responding to a card data request.

FIG. 6 illustrates an example set of operations for a method 600 for responding to a card system request 110. The method 600 is described with respect to the card system 300. The method 600 may be executed by other suitable devices as well.

At operation 610, the card availability module 314 receives a card system request 110. The card system request 110 may include state indication data 116. As previously indicated, the state indication data 116 may include a resource identifier. Additionally or alternatively, the state indication data 116 may include layout data, UI element data, and/or content data. For example, the indication data 116 may be a document (e.g., a JSON file or a markup file) indicating the layout data, UI element data, and/or the content defined at the state. The indication data 116 may alternatively be a value (e.g., a hash value representing the state) that is indicative of the layout data, UI element data, and/or the content defined at the state. The state indication data 116 may be a screenshot of the state or the output of an analysis (e.g., OCR) of the screenshot.

At operation 612, the card availability module 314 determines whether the card generation module 316 can provide a card 102 to the user device 200 given the state indication data 116. In scenarios where the state indication data 116 includes a resource identifier, the card availability module 314 can search the card data store 322 for a card record 324 indexed by a matching resource identifier. In scenario where the state indication data 116 includes layout data, UI element data, and/or content data the card availability module 314 can search the card data store 322 for a card record 324 indexed by the matching layout data, UI element data, and/or content data. In some of these implementations, the card generation module 316 may use a hash value based on the received state indication data 116 to search the card data store 322 for a record with a matching hash value. The card data store 322 may be searched using an inverted index or in any other suitable manner.

If the card availability module 314 determines that the system 300 cannot deliver a card for the indicated state, the card availability module 314 transmits an availability indicator 122 that indicates no card is available, as shown at 614. If the card availability module 314 determines that a card can be delivered at 612, the card system 300 delivers an availability indictor 122 to the user device 200. The card availability module 314 may encode the availability indicator 122 in a card system response 120 and may transmit the card system response 120 to the user device.

The card generation module 316 may further transmit a card object to the user device 200. The card generation module 316 may transmit the card object with the availability indicator 122. Alternatively, the card generation module 316 transmits the card object in response to a user explicitly requesting the card 102 (e.g., by pressing the card button 202). The card generation module 316 may generate the card object using the card record 324 corresponding to the state indication data 116.

In some implementations, the card generation module 316 utilizes the card data 336, the access mechanisms 334 (e.g., web resource identifier and/or application resource identifier), and card layout 337 of card record 324 to generate the card object. In these implementations, the card records 324 define single states of applications. The card generation module 316 includes the card data 336 and the resource identifier in the card layout 336 to generate the card object. In other implementations, a card record 322 can be used to generate multiple card objects corresponding to different states of an application. In these implementations, the card generation module 316 can obtain the access mechanism template 335 and may generate the access mechanism 334 for the state indicated by the state indication data 116 based on the content of the indicated state and the accessed state. For instance, if the current state is a state of a flight booking application showing different flight options for a given airport code pair and date pair, the card generation module 316 can insert values corresponding to the airport codes and the dates indicated at the state into the resource identifier template 337 to generate an access mechanism that links to the dynamic state that corresponds to the provided values.

The card generation module 316 may utilize a schema of the application to generate the values. For instance, the format of dates may be defined by the schema of the flight booking application (e.g., "dept_date=[day].[month].[year]" vs. "dept_date=[day]-[month]-[year]"). The card generation module 316 may include the access mechanism in the card object 122. The card generation module 316 may transmit the card object to the user device 200.

The methods 500, 600 of FIGS. 5 and 6 are provided for example only. Variations of the methods 500, 600 are within the scope of the disclosure.

Figure 7:
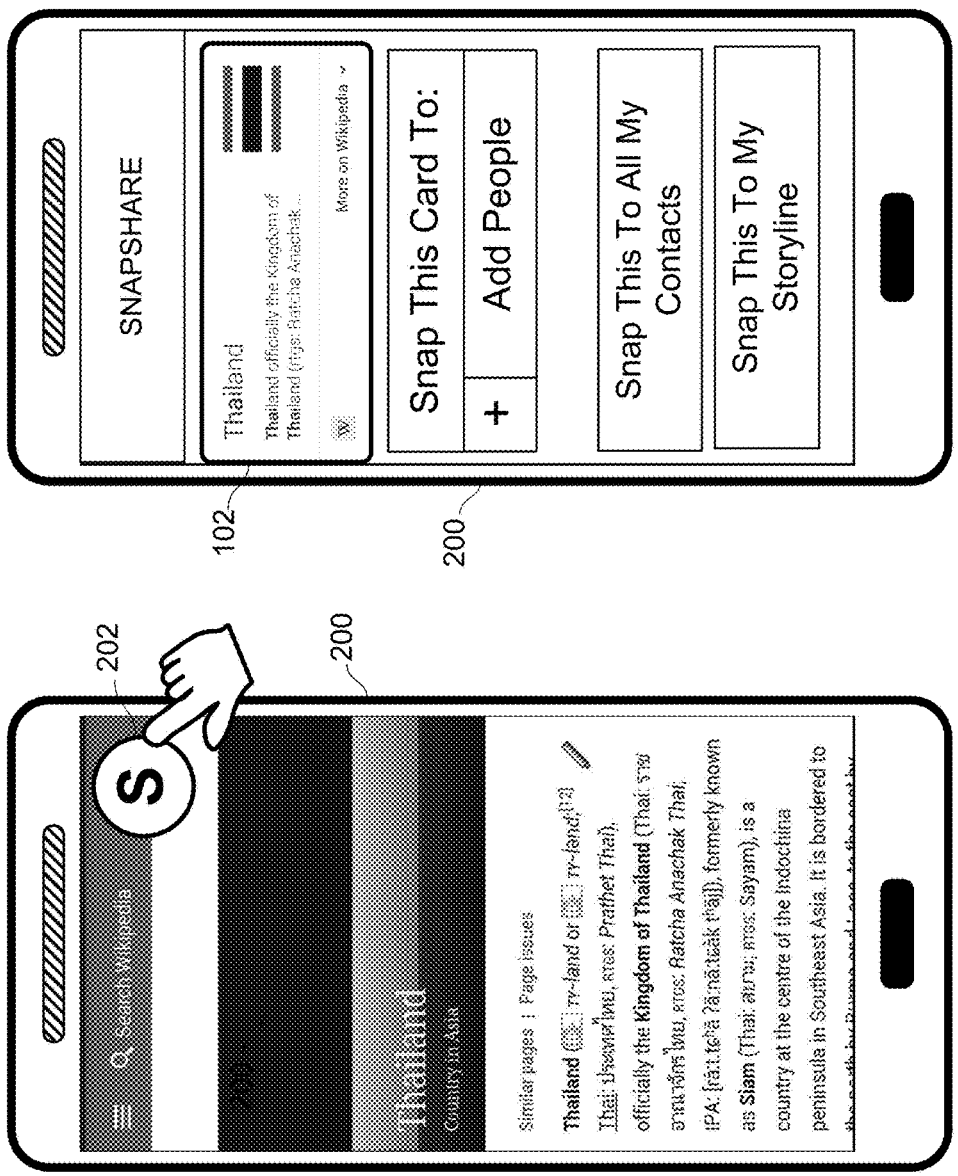
FIGS. 7A-7B illustrates an example of the button application sharing a card representing a state of an active application to a messaging target application.

FIGS. 7A and 7B illustrate an example of a user device 200 inserting a card 102 corresponding to a WIKIPEDIA article into a target application. In this example, the card button 202 corresponds to an example target application called "Snapshare." In FIG. 7A, the active application is the WIKIPEDIA application. In response to the user selecting the card button 202 overlayed upon the WIKIPEDIA application, the button application 212 launches the Snapshare application and inserts a card 102 corresponding to the state of the WIKIPEDIA application. In this way, the user can share the card with one or more users of the Snapshare application. In this example, a user can share the card using different features of the target application. In some implementations, the button application 212 can insert the card into a specific function of the target application. For instance, in the illustrated example, selection of the card button 202 may insert the Wikipedia card 102 directly to the story feature of the application. In some implementations, the button application 212 can access an API of the target application to insert the card 102 to the target application.

Figure 8:
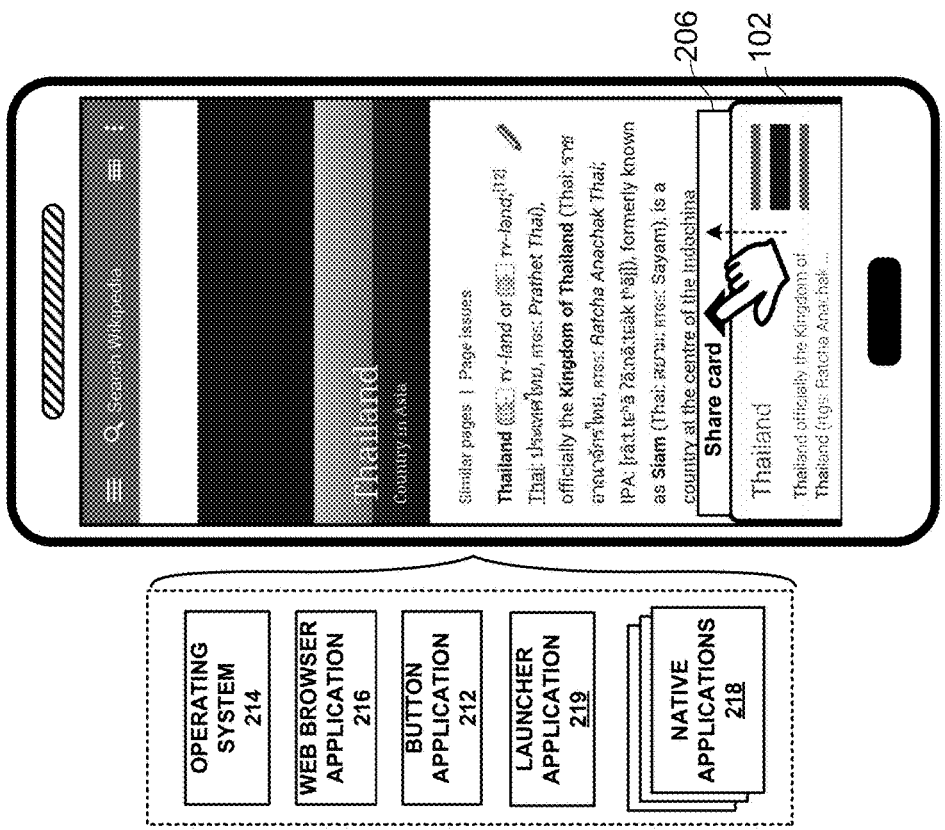
FIG. 8 illustrates an example implementation where the functionality attributed to the button application is included in a launcher application of the user device.

FIG. 8 illustrates an example implementation where the functionality attributed to the button application 212 is included in a launcher application 219 of the user device 200. The launcher application 219 may be the stock launcher application included as part of the user device 200 or may be a third party launcher 219 that the user installs on the user device 200. In addition to the button application functionality, the launcher application 219 may render the main view of the user device 200 (e.g., the home screen). The launcher application 219 may also be responsible for launching native applications 218 and hosting widgets on the home screen. In some implementations, the user may perform a gesture to reveal an available card 102 to insert into the target application. In the example GUI of FIG. 8, the launcher application 219 reveals the card 102 to the user in response to detecting a user swipe upward from the bottom of the display.

In some implementations, the launcher application 219 may render an indicator 206 on the display to indicate that the card 102 is available. For example, in FIG. 8 the launcher may render the "Share card" tab 206 at the bottom of the display to indicate a card 102 is available. In these implementations, the launcher application 219 may refrain from rendering the share card tab if the card 102 is unavailable.

In other implementations, the launcher application 219 may not render a tab, regardless of card availability. Instead, the user may perform a gesture to see whether a card 102 is available. For example, the user may perform the swiping gesture of FIG. 8 to see whether a card is available. If a card is available, the launcher application 219 may render the card 102 upon detection of the user gesture. If a card is unavailable, the launcher application 219 may render an indication that the card 102 is unavailable (e.g., a blank tab or text stating "card unavailable") in response to detecting the user's gesture.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The terms "data processing apparatus," "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
presenting, by a processing device of a user device, a state of a first application;
obtaining, by the processing device of the user device, state indication data corresponding to the state of the first application;
transmitting, by the processing device of the user device, the state indication data to a card system so that the card system can determine whether a card object corresponding to the indicated state can be delivered to the user device based on the state indication data and a plurality of card records, each card record corresponding to one or more states of an application;
receiving, by the processing device, an availability indicator indicating whether the card system can provide a card corresponding to the state of the first application;
when the availability indicator indicates that the card system can provide the card, displaying a first selection element overlaying a graphical user interface of the first application;
when the availability indicator indicates that the card system cannot provide the card, displaying a second selection element overlaying a graphical user interface of the first application;
receiving, by the processing device of the user device, a user selection of the first selection element;
obtaining, by the processing device of the user device, the card; and
inserting, by the processing device of the user device, the card into a target application in response to the user selection.

2. The method of claim 1, wherein the state indication data includes a URL or an application resource identifier.

3. The method of claim 1, wherein the state indication data includes layout information indicating a layout of the state, user input element information indicating user input elements displayed in a graphical user interface presented at the state, and/or content information indicating content provided at the state.

4. The method of claim 1, wherein inserting the card into the target application includes:
displaying a plurality of application selection elements, each application selection element corresponding to a different application; and
receiving a second user selection of one of the plurality of application selection elements, the selected application selection element corresponding to the target application.

5. The method of claim 1 wherein the first selection element is a card button displayed in a first manner and the second selection element is the card button displayed in a second manner.

6. A non-transitory computer-readable medium storing a set of computer readable instructions executable by a processing device of a user device, the computer readable instructions, when executed by the processing device, causing the processing device to:
present a state of a first application via a user interface of the user device;
obtain state indication data corresponding to the state of the first application;
transmit the state indication data to a card system so that the card system can determine whether a card object corresponding to the indicated state can be delivered to the user device based on the state indication data and a plurality of card records, each card record corresponding to one or more states of an application;
receive an availability indicator indicating whether the card system can provide a card corresponding to the state of the first application;
display a first selection element over a graphical user interface of the first application when the availability indicator indicates that the card system can provide the card;
display a second selection element over a graphical user interface of the first application when the availability indicator indicates that the card system cannot provide the card;

receive a user selection of the first selection element;
obtain the card; and
insert the card into a target application in response to the user selection.

7. The computer-readable medium of claim 6, wherein the state indication data includes a URL or an application resource identifier.

8. The computer-readable medium of claim 6, wherein the state indication data includes layout information indicating a layout of the state, user input element information indicating user input elements displayed in a graphical user interface presented at the state, and/or content information indicating content provided at the state.

9. The computer-readable medium of claim 8, wherein the state indication data includes a value that is a function of the layout information, the user input element information, and/or the content information.

10. The computer-readable medium of claim 6, wherein inserting the card into the target application includes:
displaying a plurality of application selection elements, each application selection element corresponding to a different application; and
receiving a second user selection of one of the plurality of application selection elements, the selected application selection element corresponding to the target application.

11. The computer-readable medium of claim 6, wherein the first selection element is a card button displayed in a first manner and the second selection element is the card button displayed in a second manner.

12. A method comprising:
receiving, at a processing system, a card system request from a user device, the card system request include state indication data indicating a state of an active application executing on the user device;
determining, by the processing system, whether a card object corresponding to the indicated state can be delivered to the user device based on the state indication data and a plurality of card records, each card record corresponding to one or more states of an application; and
when the card object can be delivered to the user device:
transmitting, by the processing system, an availability indicator to the user device indicating the card object can be delivered so that the user device can display a first selection element over a graphical user interface of the active application when the availability indicator indicates that the card object can be delivered;
generating, by the processing system, the card object, the card object including an one or more resource identifiers linking to the indicated state, card data defining content that is presented in a card corresponding to the indicated state, and a layout file defining a layout of the card corresponding to the indicated state, the content being bound to the layout file;
providing, by the processing system, the card object to the user device so that the user device can insert the card object into a target application in response to a user selection of the first selection element.

13. The method of claim 12, wherein the state indication data includes a URL of the indicated state or an application resource identifier of the indicated state.

14. The method of claim 13, wherein determining whether the card object can be delivered includes searching the plurality of card records using the URL or the application resource identifier, wherein the card object can be delivered when a card record matching the URL or the application resource identifier is identified.

15. The method of claim 12, wherein the state indication data includes layout information indicating a layout of the state, user input element information indicating user input elements displayed in a graphical user interface presented at the state, and/or content information indicating content provided at the state.

16. The method of claim 15 determining whether the card object can be delivered includes:
   determining a value based on the layout information, the user input element information, and or the content information; and
   searching the plurality of card records using the determined value, wherein the card object can be delivered when a card record defining a matching value is identified.

17. The method of claim 12, wherein each of the plurality of card records corresponds to a respective state of a respective application and includes definition of a layout of the respective state, one or more user input elements of the respective state, and/or content of the respective state.

18. The method of claim 17, wherein determining whether the card object can be delivered includes searching the plurality of card records using the layout definition, information regarding the one or more user input elements, and/or the content, wherein the card object can be delivered when a card record matching the layout definition, user input element information, and/or the content is identified.

* * * * *